(12) United States Patent
Umesawa et al.

(10) Patent No.: US 11,775,184 B2
(45) Date of Patent: Oct. 3, 2023

(54) MEMORY SYSTEM, INFORMATION PROCESSING APPARATUS, AND INFORMATION PROCESSING SYSTEM

(71) Applicant: Kioxia Corporation, Tokyo (JP)

(72) Inventors: Kentaro Umesawa, Kawasaki (JP); Teruji Yamakawa, Chuo (JP)

(73) Assignee: Kioxia Corporation, Tokyo (JP)

( * ) Notice: Subject to any disclaimer, the term of this patent is extended or adjusted under 35 U.S.C. 154(b) by 254 days.

(21) Appl. No.: 17/016,732

(22) Filed: Sep. 10, 2020

(65) Prior Publication Data
US 2021/0223968 A1 Jul. 22, 2021

(30) Foreign Application Priority Data
Jan. 22, 2020 (JP) .................. 2020-008265

(51) Int. Cl.
*G06F 3/06* (2006.01)
*H04L 9/08* (2006.01)
(52) U.S. Cl.
CPC .......... *G06F 3/0623* (2013.01); *G06F 3/0655* (2013.01); *G06F 3/0679* (2013.01); *H04L 9/0825* (2013.01); *H04L 9/0861* (2013.01)
(58) Field of Classification Search
None
See application file for complete search history.

(56) References Cited

U.S. PATENT DOCUMENTS

| 9,037,854 | B2 | 5/2015 | Roth et al. | |
|---|---|---|---|---|
| 9,191,200 | B1* | 11/2015 | Adams | H04W 12/06 |
| 9,501,665 | B2 | 11/2016 | Scarlata | |
| 9,716,594 | B2* | 7/2017 | Offenberg | G06F 21/64 |
| 9,954,680 | B1* | 4/2018 | Machani | H04L 9/0825 |
| 2013/0212367 | A1* | 8/2013 | Ingalls | G06F 21/88 |
| | | | | 726/1 |

(Continued)

FOREIGN PATENT DOCUMENTS

JP 2015-232810 A 12/2015

OTHER PUBLICATIONS

Barker et al., "Recommendation for Pair-Wise Key Establishment Schemes Using Discrete Logarithm Cryptography", NIST Special Publication 800-56A, https://csrc.nist.gov/publications/sp800, Mar. 2006, 117 pages.
Barker et al., "Recommendation for Pair-Wise Key Establishment Schemes Using Integer Factorization Cryptography", NIST Special Publication 800-56B, https://csrc.nist.gov/publications/s5800, Apr. 2009, 115 pages.
Barker et al., "Recommendation for Cryptographic Key Generation", NIST Special Publication 800-133, https//csrc.nist.gov/publications/sp800, Dec. 2012, 27 pages.

(Continued)

*Primary Examiner* — Bassam A Noaman
(74) *Attorney, Agent, or Firm* — Oblon, McClelland, Maier & Neustadt, L.L.P.

(57) ABSTRACT

According to one embodiment, a memory system includes a first nonvolatile memory, a second nonvolatile memory and a controller. The first nonvolatile memory includes a first memory element. The second nonvolatile memory includes a second memory element in which data is able to be written only once. The second memory element stores first key information. The controller receives second key information stored in an information processing apparatus, generates a first key using the first key information and the second key information, and generates a second key using at least the first key. The controller encrypts data, which is to be written into the first nonvolatile memory, with the second key, and decrypts data, which is read from the first nonvolatile memory, with the second key.

7 Claims, 13 Drawing Sheets

(56) References Cited

U.S. PATENT DOCUMENTS

| | | |
|---|---|---|
| 2015/0293857 A1* | 10/2015 | Cope ................... G06F 3/0679 |
| | | 713/193 |
| 2015/0358321 A1 | 12/2015 | Udagawa et al. |
| 2015/0370725 A1* | 12/2015 | McMullen .......... G06F 21/6218 |
| | | 713/193 |
| 2017/0230179 A1 | 8/2017 | Mannan et al. |
| 2017/0250809 A1* | 8/2017 | Leggette ............... G06F 3/0604 |
| 2019/0095651 A1* | 3/2019 | Yokoi ................... G06F 3/0647 |
| 2020/0099511 A1* | 3/2020 | Jarry-Lacombe ... G06F 21/6209 |
| 2020/0119917 A1* | 4/2020 | Christensen .......... H04L 9/0894 |
| 2021/0111875 A1* | 4/2021 | Le Saint ................ H04L 9/085 |

OTHER PUBLICATIONS

Chen, "Recommendation for Key Derivation Using Pseudorandom Functions", NIST Special Publication 800-108, https./csrc.nist.gov/publications/sp800, Nov. 2008, 21 pages.

Dang, "Recommendation for Existing Application-Specific Key Derivation Functions", NIST Special Publication 800-135, https://csrc.nist.gov/publications/sp800, Dec. 2010, 24 pages.

Dworkin, "Recommendation for Block Cipher Modes of Operation: Methods for Key Wrapping", NIST Special Publication 800-38F, https://csrc.nist.gov/publications/sp800, Dec. 2012, 31 pages.

\* cited by examiner

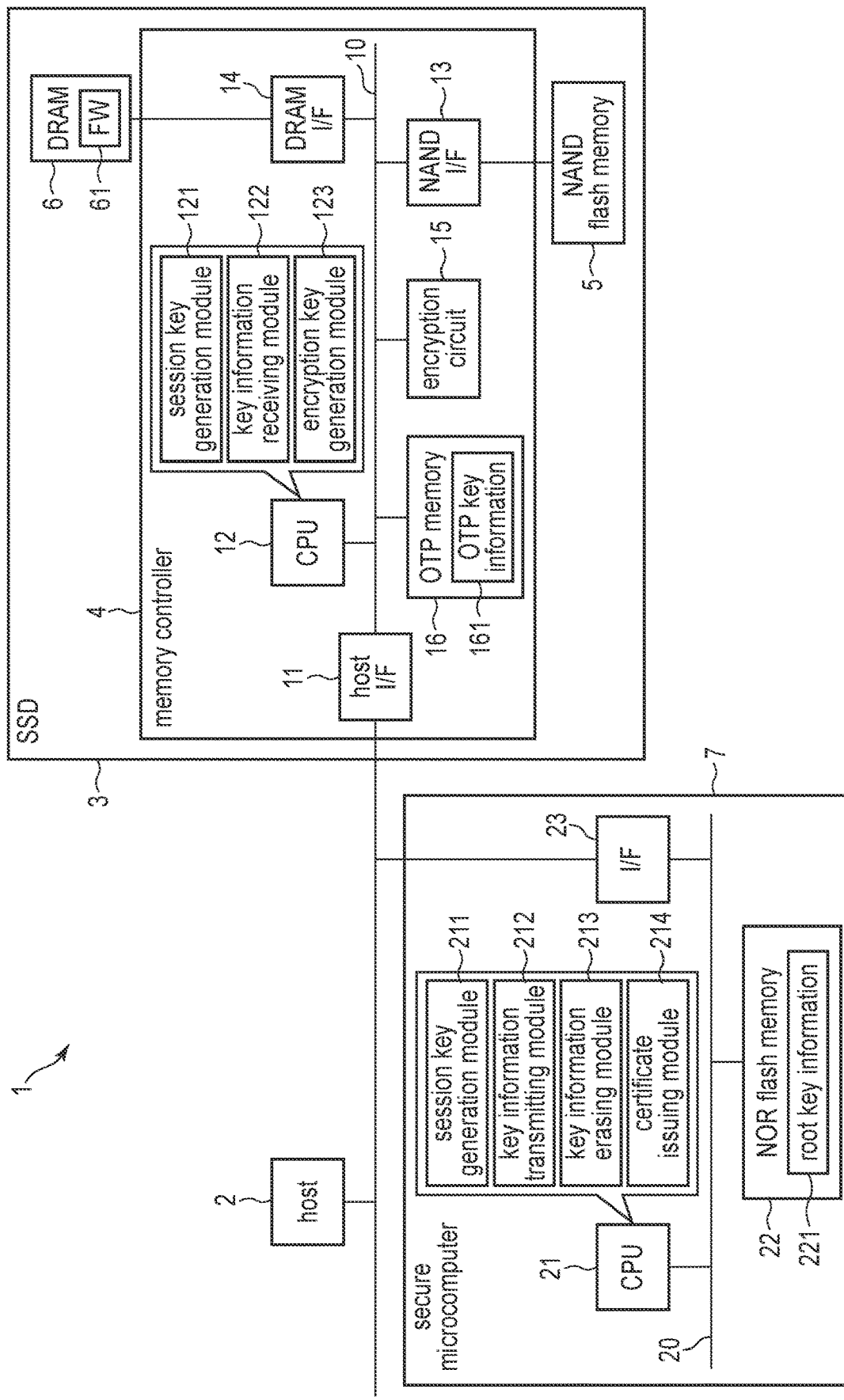
F I G. 1

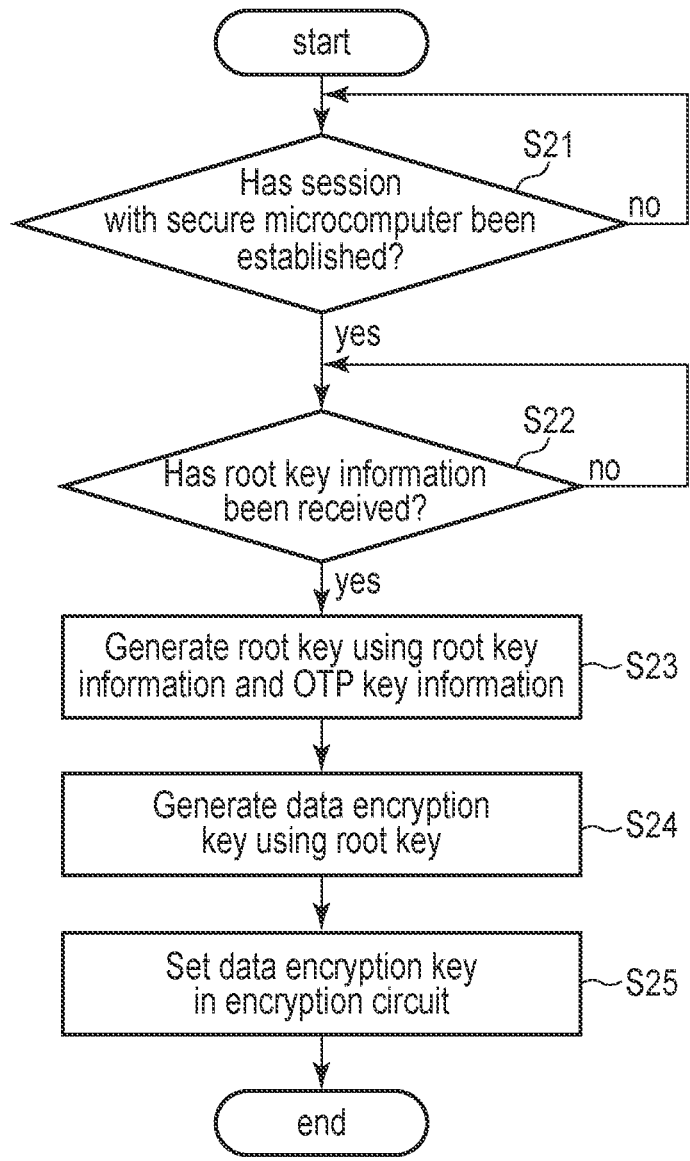
F I G. 4

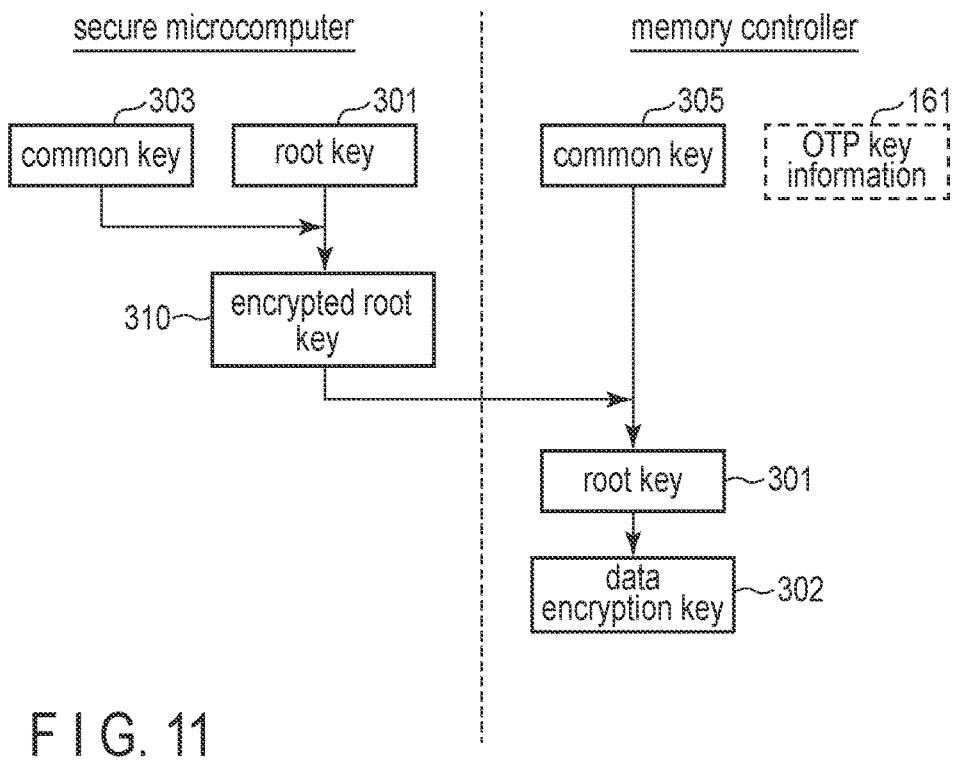
F I G. 11
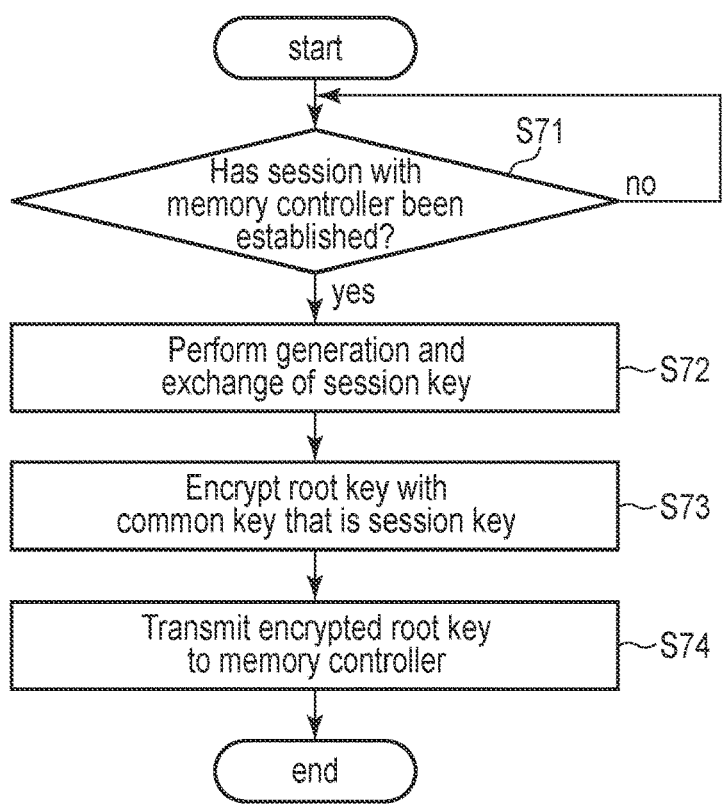
F I G. 12

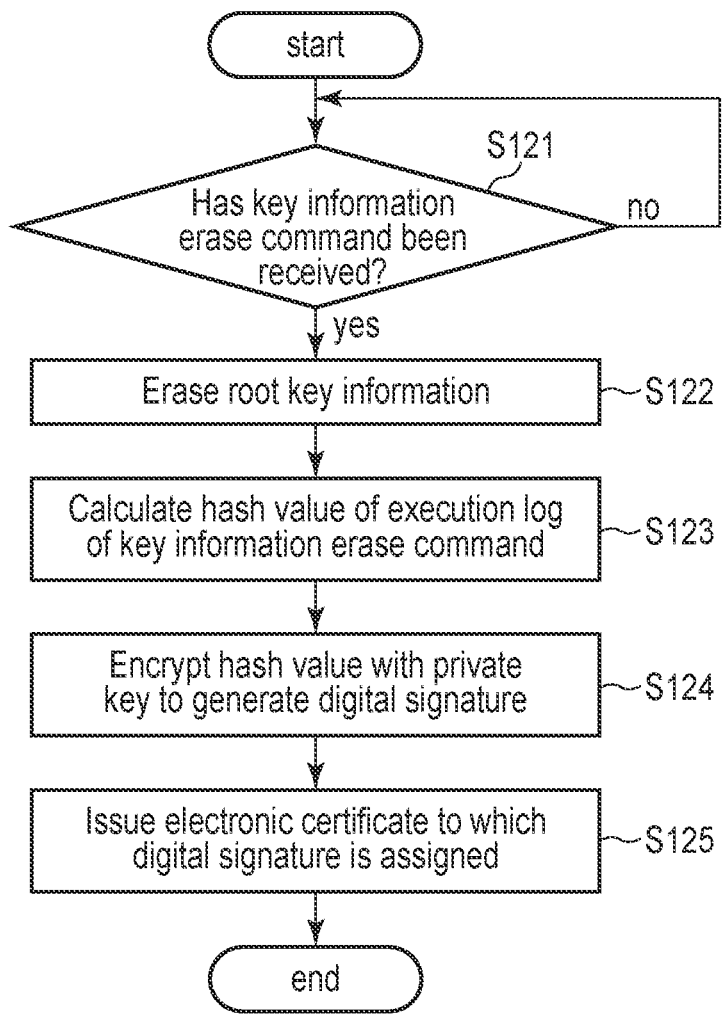
F I G. 19

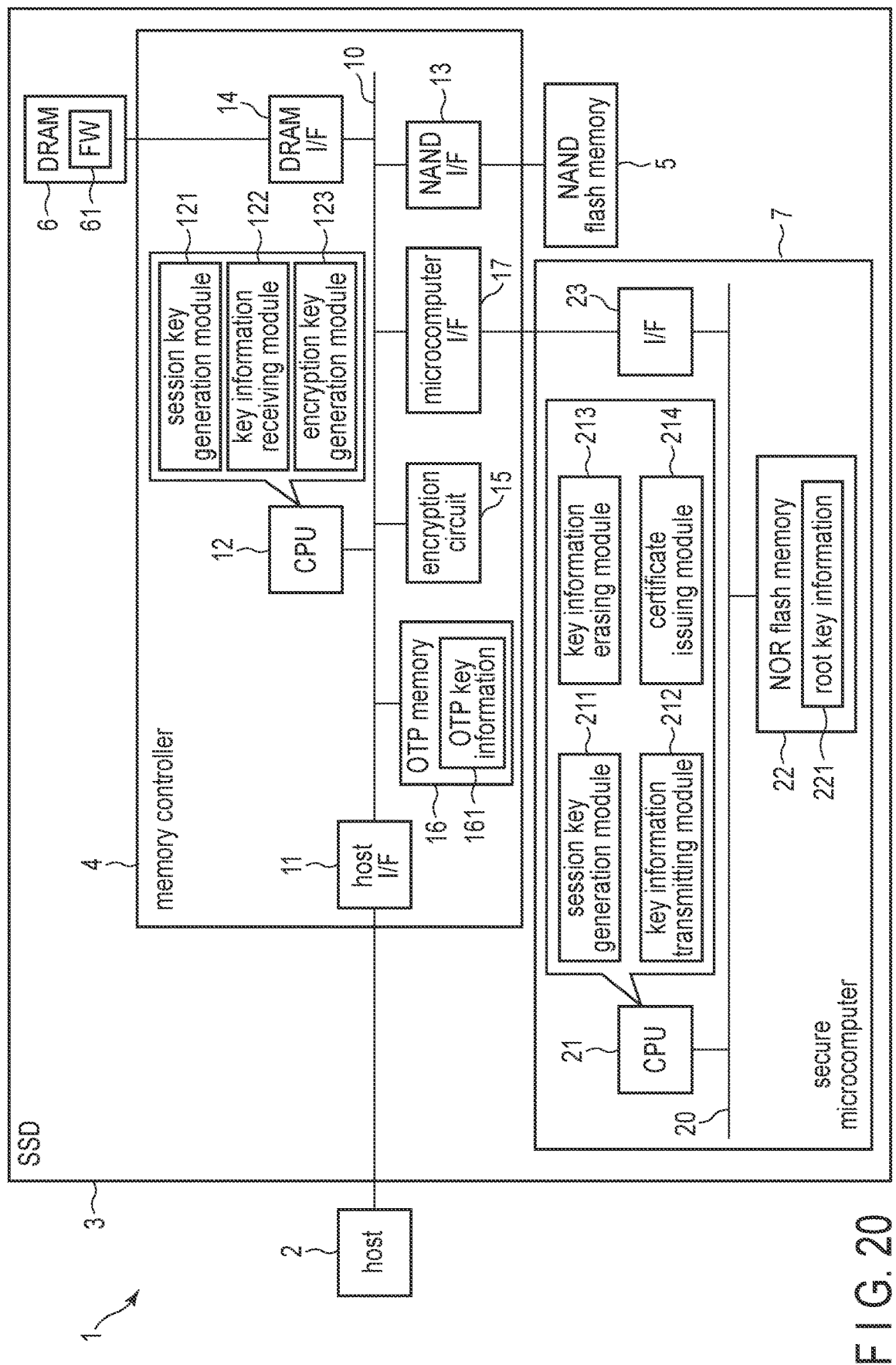
F I G. 20 ized memory for hundreds of pages...

MEMORY SYSTEM, INFORMATION PROCESSING APPARATUS, AND INFORMATION PROCESSING SYSTEM

CROSS-REFERENCE TO RELATED APPLICATIONS

This application is based upon and claims the benefit of priority from Japanese Patent Application No. 2020-008265, filed Jan. 22, 2020, the entire contents of which are incorporated herein by reference.

FIELD

Embodiments described herein relate generally to a technology of controlling a memory system including a nonvolatile memory.

BACKGROUND

In recent years, a memory system including a nonvolatile memory has become widespread.

As one of such memory systems, a solid state drive (SSD) including a NAND flash memory has been known. The SSD has been used as a main storage for various computing devices.

Since regulations for handling personal information such as general data protection regulation (GDPR) are being strengthened, a function that can guarantee that data is securely erased from the nonvolatile memory in the memory system is important.

It can be certificated whether the erase function is properly implemented in the memory system (that is, a storage device) by allowing the memory system to have a function of providing a data dump of all blocks including defective blocks in an authorizing phase. A vendor that supplies the memory system provides the data dump, and thus can certificate that the memory system has at least a certain level of erase function to, for example, a cloud service providing company that uses the memory system.

However, it is not easy to guarantee that the erase operation is actually performed on a data storage region that cannot be overwritten with a command from a user or a data storage region in a defective block or the like from which it is difficult to erase data while the memory system is actually used. Thus, it is desired to realize a new function that can increase the reliability of the erase operation and enhance the security against data leakage.

BRIEF DESCRIPTION OF THE DRAWINGS

FIG. 1 is a block diagram illustrating a configuration example of an information processing system including a memory system and an information processing apparatus, according to a first embodiment.

FIG. 4 is a flowchart illustrating a first example of a procedure of an encryption key setting process executed in the memory system of the first embodiment.

FIG. 11 is a diagram illustrating a fourth example in which the data encryption key is generated in the information processing system of the first embodiment.

FIG. 12 is a flowchart illustrating a fourth example of the procedure of the key information transmission process executed in the secure microcomputer of the first embodiment.

FIG. 19 is a flowchart illustrating an example of the procedure of the cryptographic erase process including an issuance of the electronic certificate executed in the secure microcomputer of the first embodiment.

FIG. 20 is a block diagram illustrating a configuration example of an information processing system according to a second embodiment.

DETAILED DESCRIPTION

Figure 2:
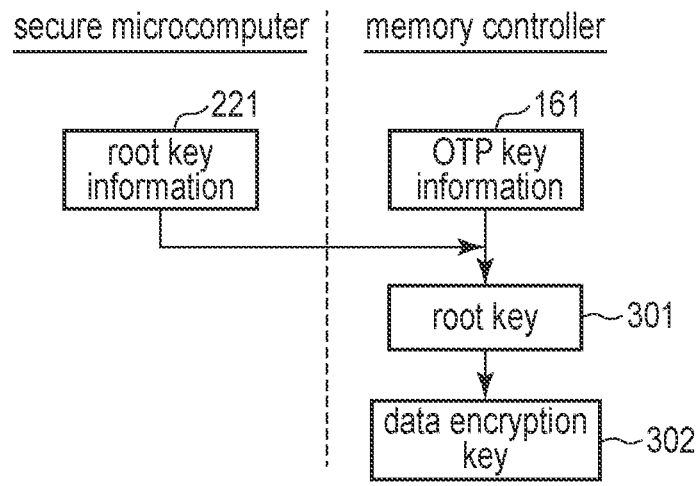
FIG. 2 is a diagram illustrating a first example in which a data encryption key is generated in the information processing system of the first embodiment.

Various embodiments will be described hereinafter with reference to the accompanying drawings.

In general, according to one embodiment, a memory system includes a first nonvolatile memory, a second nonvolatile memory and a controller. The first nonvolatile memory includes a first memory element. The second nonvolatile memory includes a second memory element in which data is able to be written only once. The second memory element stores first key information. The controller receives second key information stored in an information processing apparatus, generates a first key using the first key information and the second key information, and generates a second key using at least the first key. The controller encrypts data, which is to be written into the first nonvolatile memory, with the second key, and decrypts data, which is read from the first nonvolatile memory, with the second key.

First Embodiment

First, a configuration of an information processing system 1 according to a first embodiment will be described with reference to FIG. 1. The information processing system 1 includes a host device 2 (hereinafter, referred to as a host 2), a memory system, and an information processing apparatus. The memory system is a semiconductor storage device configured to write data into a nonvolatile memory such as a NAND flash memory 5 and read data from the nonvolatile memory, and is also called a storage device. The nonvolatile memory includes memory elements in each of which data is able to be written multiple times. The memory system is realized as, for example, a solid state drive (SSD) 3 including the NAND flash memory 5. Hereinafter, a case where the memory system is realized as the SSD 3 will be exemplified, but the memory system may be realized as a hard disk drive (HDD).

The SSD 3 has a self-encrypting function that automatically encrypts data at the time of writing to prevent data leakage. That is, the SSD 3 is a self-encrypting drive (SED) having the self-encrypting function. The SSD 3 conforms to, for example, the trusted computing group (TCG) standard and has a self-encrypting function defined by the TCG standard. The TCG standard specifies, for example, data encryption and access control for each partial area of storage.

In addition, when cryptographic erase is requested for the SSD 3 that has the self-encrypting function, a data encryption key for encrypting data or key information for generating (that is, deriving) the data encryption key is erased. As a result, data that is encrypted with the erased data encryption key and stored in the NAND flash memory 5 cannot be decrypted, so data leakage can be prevented.

In the cryptographic erase, there is no need to perform an erase operation on the encrypted data itself that is stored in the NAND flash memory 5, and the encrypted data can be regarded as erased by erasing the data encryption key or the key information used for encryption. Therefore, the cryptographic erase can be said to be a data erasing method having high reliability.

The host 2 may be a storage server that stores a large amount of various data in the SSD 3, or a personal computer. Alternatively, the host 2 may be various electronic devices that handle information to be kept confidential, such as personal information. The electronic devices include, for example, a copy machine and an in-vehicle drive recorder.

The SSD 3 may be used as a storage for the host 2. The SSD 3 may be built in the host 2 or may be connected to the host 2 via a cable or a network.

The information processing apparatus has a function of protecting data stored in the SSD 3. The information processing apparatus is realized as, for example, a microcomputer. Hereinafter, this information processing apparatus is also referred to as a secure microcomputer 7.

The secure microcomputer 7 manages key information necessary for generating a data encryption key. The data encryption key is used to encrypt data to be written into the NAND flash memory 5 of the SSD 3 and decrypt data read from the NAND flash memory 5. Note that the key information may be information used to generate the data encryption key or may be the data encryption key itself.

The SSD 3 generates the data encryption key using the key information managed by the secure microcomputer 7. In other words, the SSD 3 cooperates with the secure microcomputer 7 to generate the data encryption key. The secure microcomputer 7 is connected to the SSD 3 via a cable or a network. Note that multiple SSDs 3 may generate the data encryption keys, respectively, using the key information managed by the secure microcomputer 7. That is, the secure microcomputer 7 may manage the key information used by the multiple SSDs 3.

As interfaces for connecting the host 2 and the SSD 3 and connecting the secure microcomputer 7 and the SSD 3, SCSI, serial attached SCSI (SAS), AT attachment (ATA), serial ATA (SATA), PCI express (PCIe) (registered trademark), Ethernet (registered trademark), Fibre channel, or NVM Express (NVMe) (registered trademark) may be used.

The SSD 3 includes a memory controller 4 and the NAND flash memory 5. The memory controller 4 may be realized with a circuit such as a system-on-a-chip (SoC).

The SSD 3 may include a random access memory (RAM) that is a volatile memory and, for example, a dynamic random access memory (DRAM) 6. Alternatively, a static random access memory (SRAM) may be built in the memory controller 4. Note that the DRAM 6 may also be built in the memory controller 4.

The RAM such as the DRAM 6 includes, for example, a storage area of firmware (FW) 61 that is loaded from the NAND flash memory 5.

The NAND flash memory 5 includes multiple blocks. Each block includes multiple pages. The blocks each function as a minimum data erase unit. A block may be referred to as an erase block or a physical block. Each of the pages includes memory cells connected to a single word line. The pages each function as a unit of a data write operation and a data read operation. Note that a word line may be used as the unit of the data write operation and the data read operation.

The tolerable maximum number of program/erase cycles (maximum number of P/E cycles) for each of the blocks is limited. One P/E cycle of a block includes a data erase operation to erase data stored in all memory cells in the block and a data write operation to write data in each page of the block.

The memory controller 4 may include a host interface (host I/F) 11, a central processing unit (CPU) 12, a NAND interface (NAND I/F) 13, a DRAM interface (DRAM I/F) 14, an encryption circuit 15, and a one-time programmable memory (OTP memory) 16. The host I/F 11, the CPU 12, the NAND I/F 13, the DRAM I/F 14, the encryption circuit 15, and the OTP memory 16 may be mutually connected via a bus 10.

The memory controller 4 is electrically connected to the NAND flash memory 5 through the NAND I/F 13 conforming to an interface standard such as a toggle DDR and an open NAND flash interface (ONFI). The NAND I/F 13 functions as a NAND control circuit configured to control the NAND flash memory 5.

The NAND I/F 13 may be connected to NAND flash memory chips in the NAND flash memory 5 via multiple channels (Chs). By operating the NAND flash memory chips in parallel, it is possible to broaden an access bandwidth to the NAND flash memory 5.

The memory controller 4 functions as a controller configured to control the NAND flash memory 5.

The memory controller 4 may function as a flash translation layer (FTL) configured to execute data management and block management of the NAND flash memory 5. The data management executed by the FTL includes (1) management of mapping data indicative of relationship between each logical address and each physical address of the NAND flash memory 5, (2) process to hide read/write operations executed in units of page and erase operations executed in units of block, and the like. The logical address is an address used by the host 2 for addressing the SSD 3.

The management of mapping between each logical address and each physical address may be executed by using a logical-to-physical address conversion table. The memory controller 4 manages mapping between each logical address and each physical address with a certain management size unit by using the logical-to-physical address conversion table. A physical address corresponding to a logical address indicates a physical memory location in the NAND flash memory 5 to which data of the logical address is written. The logical-to-physical address conversion table may be loaded to the DRAM 6 from the NAND flash memory 5 when the SSD 3 is powered on.

Data write into one page is executable only once in a single P/E cycle. Thus, the memory controller 4 writes updated data corresponding to a logical address not to an original physical memory location in which previous data corresponding to the logical address is stored but to a different physical memory location. Then, the memory controller 4 updates the logical-to-physical address conversion table to associate the logical address with the different physical memory location and to invalidate the previous data.

The block management includes, for example, management of defective blocks, wear leveling, and garbage collection.

The host I/F 11 is a hardware interface that controls communication between the SSD 3 and each of devices that are external to the SSD 3. The external devices include the host 2 and the secure microcomputer 7. The host I/F 11 functions as a circuit that receives various commands such as I/O commands and control commands from the host 2. The I/O commands may include a write command and a read command. The control commands may include an unmap command (trim command) and a format command. The format command is a command for unmapping all the logical addresses in the SSD 3 entirely. The host I/F 11 also functions as a transmission circuit that transmits to the host 2 a response or data in accordance with a command.

The host I/F 11 further functions as a transmission/reception circuit that transmits and receives various information to and from the secure microcomputer 7. The information received from the secure microcomputer 7 includes, for example, key information for generating a data encryption key.

The DRAM I/F 14 functions as a DRAM control circuit configured to control access to the DRAM 6. Storage areas of the DRAM 6 is allocated to an area for storing the FW 61, a buffer area used as a read/write buffer and the like.

The encryption circuit 15 performs encryption and decryption of data. The encryption circuit 15 encrypts data to be written into the NAND flash memory 5 via the NAND I/F 13, and decrypts data read from the NAND flash memory 5 via the NAND I/F 13. The encryption circuit 15 performs encryption and decryption of data with, for example, a data encryption key that is set by the CPU 12.

The data encryption key is stored in, for example, a register in the encryption circuit 15. Therefore, the data encryption key that is set in the encryption circuit 15 is a volatile key, which is lost when the power supply to the SSD 3 is cut off.

The OTP memory 16 includes multiple memory elements (that is, memory cells) in each of which data is able to be written only once. Each of the memory elements in the OTP memory 16 is an irreversible memory element in which data is able to be written only once. As the OTP memory 16, for example, an electric fuse (e-Fuse) is used, but the OTP memory 16 is not limited thereto. The OTP memory 16 stores OTP key information 161 for generating a data encryption key.

The CPU 12 is a processor configured to control the host I/F 11, the NAND I/F 13, and the DRAM I/F 14. The CPU 12 performs various processes by executing the FW 61 loaded in the DRAM 6. That is, the FW 61 is control programs for controlling the operation of the CPU 12. The CPU 12 may perform, in addition to the above-described processes of FTL, command processes to execute various commands from the host 2. Note that part of or the entire FTL processes and the command processes may be executed by a dedicated hardware in the memory controller 4.

The CPU 12 may function as, for example, a session key generation module 121, a key information receiving module 122, and an encryption key generation module 123 to generate a data encryption key that is to be set in the encryption circuit 15. The CPU 12 functions as these modules by executing, for example, the FW 61.

The session key generation module 121 generates and exchanges a session key when a session is established in a connection between the memory controller 4 and the secure microcomputer 7. The session key generation module 121 may generate and exchange the session key each time the session is established, or may generate and exchange the session key only once when the session is first established between the memory controller 4 and the secure microcomputer 7. The session key may be used as a common key.

The key information receiving module 122 receives, from the secure microcomputer 7, key information to be used to generate a data encryption key. The key information is, for example, root key information 221 stored in the secure microcomputer 7. The data encryption key is an encryption key used when the encryption circuit 15 performs encryption of data and decryption of encrypted data.

The encryption key generation module 123 generates a root key using the root key information 221, which is received from the secure microcomputer 7, and the OTP key information 161 stored in the OTP memory 16. Then, the encryption key generation module 123 generates a data encryption key using the root key. That is, the data encryption key may be indirectly derived from the root key information 221 and the OTP key information 161.

The encryption key generation module 123 sets the generated data encryption key in the encryption circuit 15. As described above, the encryption circuit 15 encrypts data, which is to be written into the NAND flash memory 5, with the data encryption key, and decrypts data, which is read from the NAND flash memory 5, with the data encryption key.

Note that the key information receiving module 122 may receive from the secure microcomputer 7 any one of the root key information 221 that is encrypted, the root key itself, and an encrypted root key as the information used to generate the data encryption key, instead of the root key information 221.

When the root key information 221 encrypted with a common key is received from the secure microcomputer 7, the key information receiving module 122 decrypts the encrypted root key information 221 with the common key. Alternatively, when the root key information 221 encrypted with a public key is received from the secure microcomputer 7, the key information receiving module 122 decrypts the encrypted root key information 221 with a private key (that is, a secret key). The encryption key generation module 123 generates the root key using the decrypted root key information 221 and the OTP key information 161 stored in the OTP memory 16. Then, the encryption key generation module 123 generates the data encryption key using the root key.

Alternatively, when the root key itself is received from the secure microcomputer 7, the encryption key generation module 123 generates the data encryption key using the root key.

Furthermore, when the root key encrypted with a common key is received from the secure microcomputer 7, the key information receiving module 122 decrypts the encrypted root key with the common key. Alternatively, when the root key encrypted with a public key is received from the secure microcomputer 7, the key information receiving module 122 decrypts the encrypted root key with a private key. The encryption key generation module 123 generates the data encryption key using the decrypted root key.

More detailed examples of generating the data encryption key will be described below with reference to FIGS. 2 to 13.

The secure microcomputer 7 includes a CPU 21, a NOR flash memory 22, and an interface (I/F) 23. The CPU 21, the NOR flash memory 22, and the I/F 23 may be mutually connected via a bus 20.

The CPU 21 is a processor configured to control the operation of each unit in the secure microcomputer 7. The CPU 21 performs various processes by executing control programs stored in, for example, the NOR flash memory 22. The control programs may be referred to as FW. The CPU 21 may perform processes for managing the key information necessary for generating the data encryption key to be used in the SSD 3. The operation of the CPU 21 is controlled by the FW that is executed by the CPU 21. Note that part of or the entire processes for managing the key information may be executed by a dedicated hardware (for example, a processing circuit) in the secure microcomputer 7.

The NOR flash memory 22 includes multiple memory elements in each of which data is able to be written multiple times. In the NOR flash memory 22, the key information (for example, the root key information 221), which is necessary for generating the data encryption key to be used in the SSD 3, is stored. Note that instead of the NOR flash memory 22, another type of nonvolatile memory including multiple memory elements in each of which data is able to be written multiple times may be used.

The I/F 23 is a hardware interface that performs control of communication between the secure microcomputer 7 and each of devices outside the secure microcomputer 7. The devices include the host 2 and the SSD 3. The I/F 23 functions as a circuit that transmits and receives various commands and data to and from the host 2 and the SSD 3.

The commands received from the host 2 include a key information erase command. The key information erase command is one of commands for the cryptographic erase, and may conform to a data erase command defined in the TCG standard or other interface standards. The key information erase command is a command for erasing or changing the key information (for example, the root key information 221) for generating the data encryption key that is set in the encryption circuit 15 in the SSD 3.

By erasing the key information, the memory controller 4 of the SSD 3 cannot generate the data encryption key. Therefore, the encrypted data that is encrypted with the data encryption key and stored in the SSD 3 cannot be decrypted, so data leakage can be prevented. That is, by erasing or changing the key information for generating the data encryption key in accordance with the key information erase command, it is possible to realize the cryptographic erase in which the encrypted data stored in the SSD 3 is regarded as erased.

To manage the key information used by the memory controller 4 of the SSD 3 to generate the data encryption key, the CPU 21 may function as a session key generation module 211, a key information transmitting module 212, a key information erasing module 213, and a certificate issuing module 214.

The session key generation module 211 generates and exchanges a session key when a session is established between the secure microcomputer 7 and the memory controller 4. The session key generation module 211 may generate and exchange the session key each time the session is established, or may generate and exchange the session key only once when the session is first established between the memory controller 4 and the secure microcomputer 7. The session key may be used as a common key.

The key information transmitting module 212 reads the root key information 221, which is used for generating the data encryption key, from the NOR flash memory 22 and transmits the read root key information 221 to the memory controller 4. Note that the key information transmitting module 212 may encrypt the root key information 221 and transmit the encrypted root key information 221 to the memory controller 4.

The key information erasing module 213 performs a cryptographic erase process for erasing the root key information 221 stored in the NOR flash memory 22 in response to receiving a key information erase command from the host 2. The key information erasing module 213 may receive the key information erase command directly from the host 2, or may receive the key information erase command from the host 2 via the memory controller 4.

In the cryptographic erase process, the root key information 221 is erased and updated with new root key information 221. The key information erasing module 213 writes (overwrites) a random number in a storage area in the NOR flash memory 22 in which the root key information 221 is stored, thereby erasing the root key information 221 stored in the NOR flash memory 22. Note that the written random number may be managed as the new root key information 221.

The certificate issuing module 214 issues an electronic certificate. The electronic certificate certificates that data stored in the NAND flash memory 5 of the SSD 3 has been erased and the data erase operation has been securely done in the cryptographic erase process performed by the key information erasing module 213. The certificate issuing module 214 assigns a digital signature to log data, which is generated when the cryptographic erase process is executed, using a private key, and issues the electronic certificate. Hereinafter, the log data is also referred to as an erase log.

Note that in the secure microcomputer 7, the root key itself may be managed instead of the root key information 221 as the information used to generate the data encryption key. In that case, the key information transmitting module 212 transmits the root key (encrypted or not encrypted) to the memory controller 4. In addition, the key information erasing module 213 erases the root key stored in the NOR flash memory 22 in response to receiving the key information erase command from the host 2.

With the above configuration, security against the data leakage can be enhanced in the information processing system 1. The SSD 3 generates a root key 301 using, for example, the root key information 221 received from the secure microcomputer 7 and the OTP key information 161 stored in the OTP memory 16, and generates a data encryption key using the root key 301. In this case, by erasing the root key information 221 stored in the secure microcomputer 7, the SSD 3 cannot generate the data encryption key again. Therefore, it is possible to realize data erasure in which the encrypted data that is encrypted with the data encryption key and stored in the NAND flash memory 5 cannot be decrypted (that is, cryptographic erase).

Incidentally, in the SSD 3, the data encryption key derived directly or indirectly from the OTP key information 161 may be used. In this case, information for deriving the data encryption key directly or indirectly from the OTP key information 161 is stored in the NAND flash memory 5. The information is, for example, an encrypted data encryption key, and the data encryption key is derived by decrypting the encrypted data encryption key with the OTP key information 161.

It is possible to realize the cryptographic erase by erasing the information stored in the NAND flash memory 5. However, it is assumed that data leakage or tampering is caused due to a physical access to the NAND flash memory 5. Therefore, in such an SSD 3, the OTP key information 161 is erased to realize more reliable cryptographic erase.

When the OTP key information 161 is erased, the SSD 3 cannot generate the data encryption key likewise, so the data can be erased by disabling decryption of encrypted data stored in the NAND flash memory 5.

However, when the OTP key information 161 stored in the OTP memory 16 is erased, it is necessary to store new OTP key information 161 in the OTP memory 16 to reuse the SSD 3. This is because each memory element in the OTP memory 16 is an irreversible memory element in which data can be written only once. Therefore, in the case of using the method of erasing the OTP key information 161, the memory controller 4 needs to be provided with memory elements (storage area) for storing new OTP key information 161.

Mounting a large number of memory elements of the OTP memory 16 in the memory controller 4 increases the cost of the memory controller 4. Therefore, it is difficult to apply the method of erasing the OTP key information 161 to the SSD 3 used in such applications that frequently require the cryptographic erase. Further, it is difficult to provide a large number of memory elements (for example, a large number of e-Fuse elements) of the OTP memory 16 as a common design of the memory controller 4 to support applications in a specific field.

In the present embodiment, as described above, the root key information 221 stored in the secure microcomputer 7 is erased, and the OTP key information 161 stored in the OTP memory 16 is not erased. Therefore, it is not necessary to provide the memory controller 4 with a large number of memory elements of the OTP memory 16 for writing new OTP key information 161 each time the cryptographic erase is performed.

Furthermore, in the user environment where the SSD 3 is actually used, not in the factory environment, it is difficult to guarantee a reliable erase operation (for example, disconnection of the e-Fuse element) for the OTP memory 16 due to instability of applied voltage or the like. On the other hand, an erase operation for the NOR flash memory 22 in the secure microcomputer 7 has high reliability even in the user environment.

The SSD 3 of the present embodiment generates the data encryption key using not only the OTP key information 161 stored in the OTP memory 16 but also the root key information 221 stored in the secure microcomputer 7. Therefore, when the root key information 221 stored in the secure microcomputer 7 is erased, it is unnecessary to perform the unreliable erase operation on the OTP memory 16. Therefore, the reliability of the cryptographic erase of the SSD 3 based on erasure of the key information can be increased, and the security against the data leakage can be enhanced.

Further, in the secure microcomputer 7 of the present embodiment, new root key information 221 may be generated when the root key information 221 is erased in accordance with the key information erase command. That is, the root key information 221 may be updated in accordance with the key information erase command. In the secure microcomputer 7, the root key information 221 can be updated any number of times while the NOR flash memory 22 is operable. Therefore, while the root key information 221 can be updated, the SSD 3 is reusable by performing data erasure of the SSD 3 any number of times. As a result, it is possible to reduce the cost for providing a large amount of OTP memory 16 in the memory controller 4 in the SSD 3 used in an application in which performing reliable erasure of data many times is required.

Some examples in which the memory controller 4 of the SSD 3 generates a data encryption key by using key information received from the secure microcomputer 7 will be specifically described with reference to FIGS. 2 to 13.

First Example of Generation of Data Encryption L Key

FIG. 2 illustrates a first example in which the memory controller 4 generates a data encryption key 302. In this first example, a case where the confidentiality and integrity of the root key information 221 transmitted from the secure microcomputer 7 to the memory controller 4 are not taken into consideration is exemplified. In the first example, since the OTP key information 161 is kept secret in the OTP memory 16 in the memory controller 4, it is assumed that the confidentiality and integrity of the root key information 221 need not be taken into consideration.

The key information transmitting module 212 of the secure microcomputer 7 reads the root key information 221 from the NOR flash memory 22. The key information transmitting module 212 transmits the read root key information 221 to the memory controller 4 as it is.

The key information receiving module 122 of the memory controller 4 receives the root key information 221 from the secure microcomputer 7. The encryption key generation module 123 generates the root key 301 using the received root key information 221 and the OTP key information 161 read from the OTP memory 16. The encryption key generation module 123 uses a key derivation method described in, for example, National Institute of Standards and Technology Special Publication (NIST SP) 800-133 "Recommendation for Cryptographic Key Generation" or NIST SP 800-108 "Recommendation for Key Derivation Using Pseudorandom Functions" to generate the root key 301.

When the key derivation method described in NIST SP 800-133 is used, the encryption key generation module 123 uses an exclusive logical OR (XOR) operation on the root key information 221 and the OTP key information 161, or conversion of the root key information 221 by an encryption process using the OTP key information 161, to generate the root key 301. Further, when using the key derivation method described in NIST SP 800-108, the encryption key generation module 123 may generate the root key 301 with a key derivation function using the root key information 221 as a label (that is, input data).

The encryption key generation module 123 generates the data encryption key 302 that is indirectly or directly derived from the generated root key 301. The encryption key generation module 123 generates the data encryption key 302 by performing a specific calculation process using the root key 301. More specifically, the encryption key generation module 123 generates the data encryption key 302 by, for example, decrypting the encrypted data encryption key 302 stored in the NAND flash memory 5 with the root key 301.

The encryption key generation module 123 sets the generated data encryption key 302 in the encryption circuit 15. The encryption key generation module 123 stores the generated data encryption key 302 in, for example, a register in the encryption circuit 15.

Figure 3:
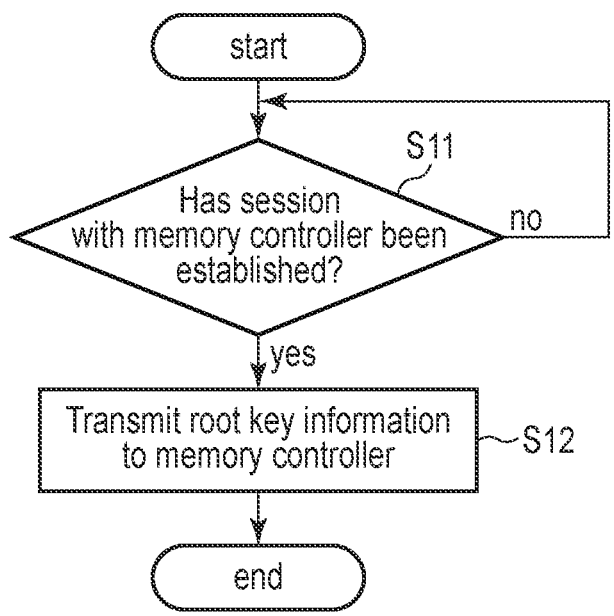
FIG. 3 is a flowchart illustrating a first example of a procedure of a key information transmission process executed in a secure microcomputer of the first embodiment.

FIG. 3 is a flowchart illustrating a first example of the procedure of a key information transmission process executed in the secure microcomputer 7.

First, the secure microcomputer 7 determines whether a session with the memory controller 4 of the SSD 3 has been established (step S11). When establishing the session, a session key (common key) may be generated and exchanged with the memory controller 4. The method of generating or sharing/exchanging the session key may be carried out in conformity to SP800-56A, SP800-56B, SP800-135 and the like. It is assumed that a public key, a common key, parameters for an encryption algorithm, and the like used here are shared or distributed (in the case of public key encryption) in advance between the secure microcomputer 7 and the memory controller 4. When a session with the memory controller 4 has not been established (NO in step S11), the process returns to step S11, and it is determined again whether a session with the memory controller 4 has been established.

When a session with the memory controller 4 has been established (YES in step S11), the secure microcomputer 7 transmits the root key information 221 stored in the NOR flash memory 22 to the memory controller 4 (step S12), and ends the key information transmission process.

FIG. 4 is a flowchart illustrating a first example of the procedure of an encryption key setting process executed in the memory controller 4.

First, the memory controller 4 determines whether a session with the secure microcomputer 7 has been established (step S21). When a session with the secure microcomputer 7 has not been established (NO in step S21), the process returns to step S21, and it is determined again whether a session with the secure microcomputer 7 has been established.

When a session with the secure microcomputer 7 has been established (YES in step S21), the memory controller 4 determines whether the root key information 221 has been received from the secure microcomputer 7 (step S22). When the root key information 221 has not been received from the secure microcomputer 7 (NO in step S22), the process returns to step S22, and it is determined again whether the root key information 221 has been received from the secure microcomputer 7.

When the root key information 221 has been received from the secure microcomputer 7 (YES in step S22), the memory controller 4 generates a root key 301 using the received root key information 221 and the OTP key information 161 stored in the OTP memory 16 (step S23). The memory controller 4 generates a data encryption key 302 using the root key 301 (step S24). Then, the memory controller 4 sets the data encryption key 302 in the encryption circuit 15 (step S25), and ends the encryption key setting process.

The data encryption key 302 is set in the encryption circuit 15 of the SSD 3 according to the configuration and procedure described with reference to FIGS. 2 to 4. Therefore, the encryption circuit 15 can use the data encryption key 302 to encrypt data to be written into the NAND flash memory 5 and to decrypt data read from the NAND flash memory 5.

Second Example of Generation of Data Encryption Key

Figure 5:
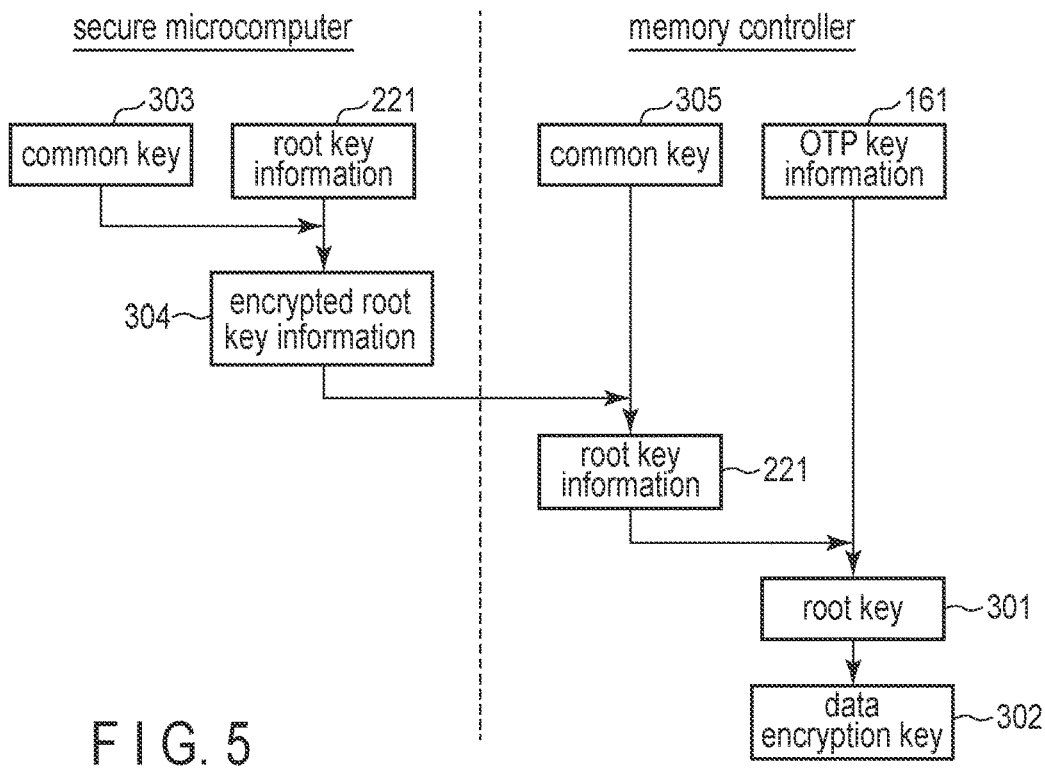
FIG. 5 is a diagram illustrating a second example in which the data encryption key is generated in the information processing system of the first embodiment.

FIG. 5 illustrates a second example in which the memory controller 4 generates the data encryption key 302. In this second example, the case where the root key information 221 is transmitted from the secure microcomputer 7 to the memory controller 4 by a common key cryptographic method to guarantee the confidentiality and integrity of the root key information 221 is exemplified.

The key information transmitting module 212 of the secure microcomputer 7 reads the root key information 221 from the NOR flash memory 22. The key information transmitting module 212 encrypts the root key information 221 with a common key 303 to acquire encrypted root key information 304. Then, the key information transmitting module 212 transmits the encrypted root key information 304 to the memory controller 4.

The common key 303 may be a key stored in the secure microcomputer 7 before the shipment of the secure microcomputer 7. Alternatively, a session key for communication shared when the session with the memory controller 4 is established may be used as the common key 303. As a method for sharing the common key 303 between the secure microcomputer 7 and the memory controller 4 may include NIST SP 800-38F "Recommendation for Block Cipher Modes of Operation: Methods for Key Wrapping".

The key information receiving module 122 of the memory controller 4 receives the encrypted root key information 304 from the secure microcomputer 7. The key information receiving module 122 decrypts the received encrypted root key information 304 with a common key 305 to acquire the root key information 221. The common key 305 is the same key as the common key 303 used in the secure microcomputer 7. Similar to the common key 303 used in the secure microcomputer 7, the common key 305 may be a key stored in the SSD 3 before the shipment of the SSD 3, or may be a session key shared when the session with the secure microcomputer 7 is established.

The encryption key generation module 123 generates a root key 301 using the root key information 221 acquired by the decryption and the OTP key information 161 read from the OTP memory 16. The key derivation method for generating the root key 301 is as described above.

The encryption key generation module 123 generates a data encryption key 302 indirectly or directly derived from the generated root key 301. The encryption key generation module 123 sets the generated data encryption key 302 in the encryption circuit 15.

Figure 6:
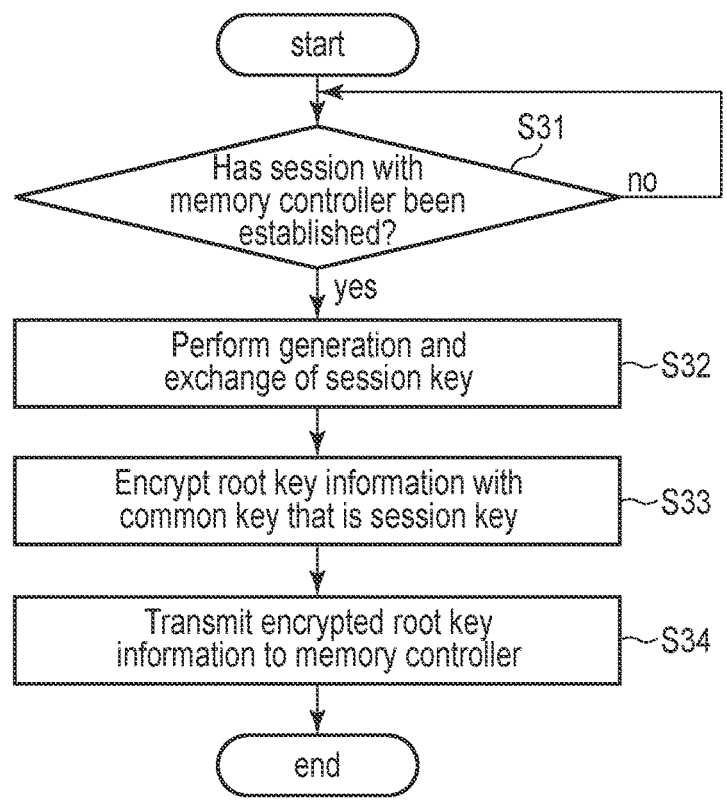
FIG. 6 is a flowchart illustrating a second example of the procedure of the key information transmission process executed in the secure microcomputer of the first embodiment.

FIG. 6 illustrates a second example of the procedure of the key information transmission process executed in the secure microcomputer 7. Here, the case where a session key generated and exchanged when establishing a session with the memory controller 4 is used as the common key 303 is exemplified.

First, the secure microcomputer 7 determines whether a session with the memory controller 4 of the SSD 3 has been established (step S31). When a session with the memory controller 4 has not been established (NO in step S31), the process returns to step S31, and it is determined again whether a session with the memory controller 4 has been established.

When a session with the memory controller 4 has been established (YES in step S31), the secure microcomputer 7 generates and exchanges a session key with the memory controller 4 (step S32). As a result, the session key used as the common keys 303 and 305 is shared between the secure microcomputer 7 and the memory controller 4. The secure microcomputer 7 encrypts the root key information 221 read from the NOR flash memory 22 with the common key 303 (that is, the session key) to acquire the encrypted root key information 304 (step S33). Then, the secure microcomputer 7 transmits the encrypted root key information 304 to the memory controller 4 (step S34), and ends the key information transmission process.

Figure 7:
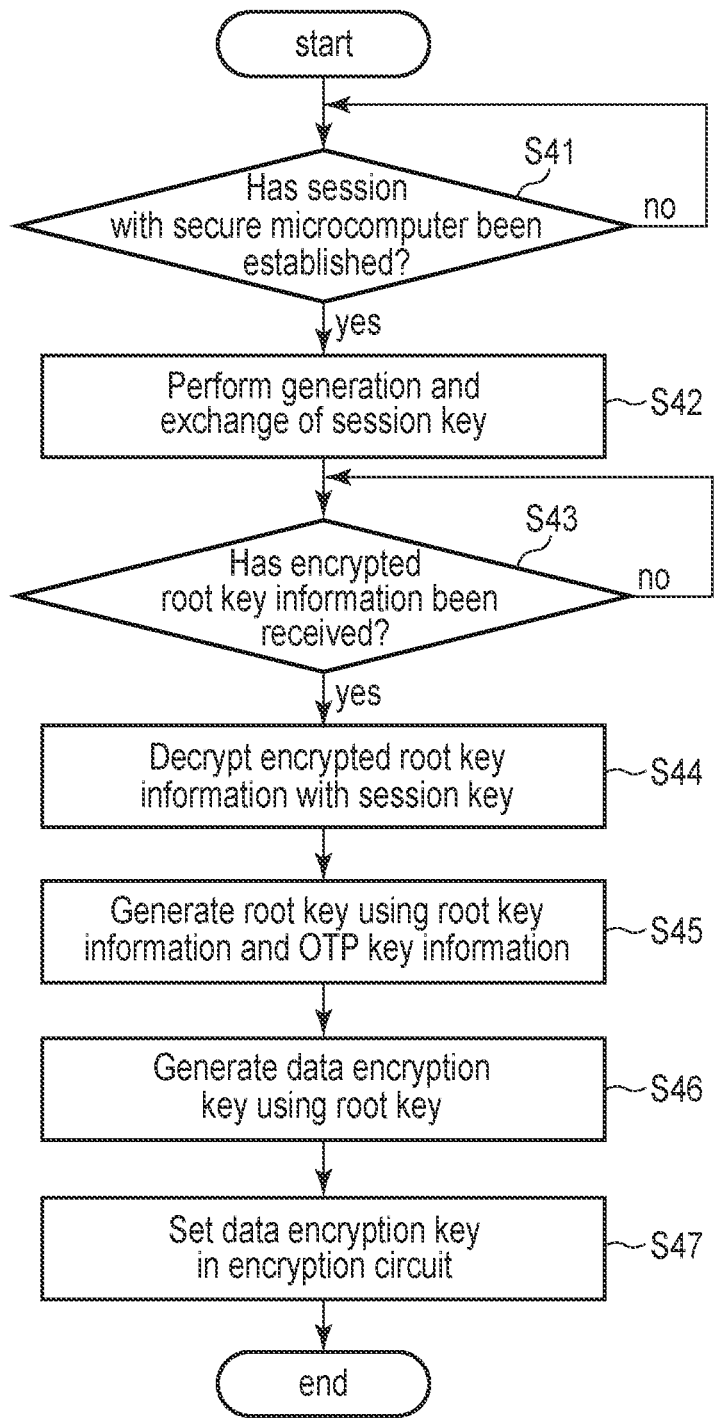
FIG. 7 is a flowchart illustrating a second example of the procedure of the encryption key setting process executed in the memory system of the first embodiment.

FIG. 7 illustrates a second example of the procedure of the encryption key setting process executed in the memory controller 4. Here, the case where a session key generated and exchanged when establishing a session with the secure microcomputer 7 is used as the common key 305 is exemplified.

First, the memory controller 4 determines whether a session with the secure microcomputer 7 has been established (step S41). When a session with the secure microcomputer 7 has not been established (NO in step S41), the process returns to step S41, and it is determined again whether a session with the secure microcomputer 7 has been established.

When a session with the secure microcomputer 7 has been established (YES in step S41), the memory controller 4 generates and exchanges a session key with the secure microcomputer 7 (step S42). As a result, the session key used as the common keys 303 and 305 is shared between the memory controller 4 and the secure microcomputer 7.

The memory controller 4 determines whether the encrypted root key information 304 has been received from the secure microcomputer 7 (step S43). When the encrypted root key information 304 has not been received (NO in step S43), the process returns to step S43, and it is determined again whether the encrypted root key information 304 has been received.

When the encrypted root key information 304 has been received (YES in step S43), the memory controller 4 decrypts the received encrypted root key information 304 with the common key 305 (that is, the session key) to acquire the root key information 221 (step S44). Note that if the encrypted root key information 304 is not encrypted with the common key 303, the root key information 221 cannot be acquired by the decryption using the common key 305, so the encryption key setting process ends. The decryption result of the encrypted root key information 304 using the common key 305 may include, for example, a cyclic redundancy check (CRC) code. The memory controller 4 can verify by using the CRC code whether the root key information 221 has been correctly acquired as the decryption result of the encrypted root key information 304 using the common key 305.

Alternatively, when the root key information 304 is encrypted with the common key 303 conforming to NIST SP 800-38F, the secure microcomputer 7 also generates check data during the encryption. The secure microcomputer 7 transmits the generated check data to the memory controller 4 together with the encrypted root key information 304. The memory controller 4 may verify by using the check data whether the root key information 221 has been correctly acquired as the decryption result of the encrypted root key information 304 using the common key 305.

The memory controller 4 generates a root key 301 using the acquired root key information 221 and the OTP key information 161 stored in the OTP memory 16 (step S45). The procedure of subsequent steps S46 and S47 are similar to the procedure of the steps S24 and S25, respectively, which are described above with reference to the flowchart of FIG. 4.

Note that the generation and exchange of the session key used as the common key 305 becomes a factor that prolongs a startup time of the SSD 3. Therefore, the memory controller 4 may encrypt the session key (common key 305) with the OTP key information 161 and store, in the NAND flash memory 5, the encrypted session key. In this case, the memory controller 4 decrypts the stored encrypted session key with the OTP key information 161 and decrypts the encrypted root key information 304, which is received from the secure microcomputer 7, with the decrypted session key (common key 305) to generate the root key 301.

The data encryption key 302 is set in the encryption circuit 15 of the SSD 3 according to the configuration and procedure described with reference to FIGS. 5 to 7 above. Therefore, by using the data encryption key 302, the encryption circuit 15 can encrypt data to be written into the NAND flash memory 5 and decrypt data read from the NAND flash memory 5.

Third Example of Generation of Data Encryption Key

Figure 8:
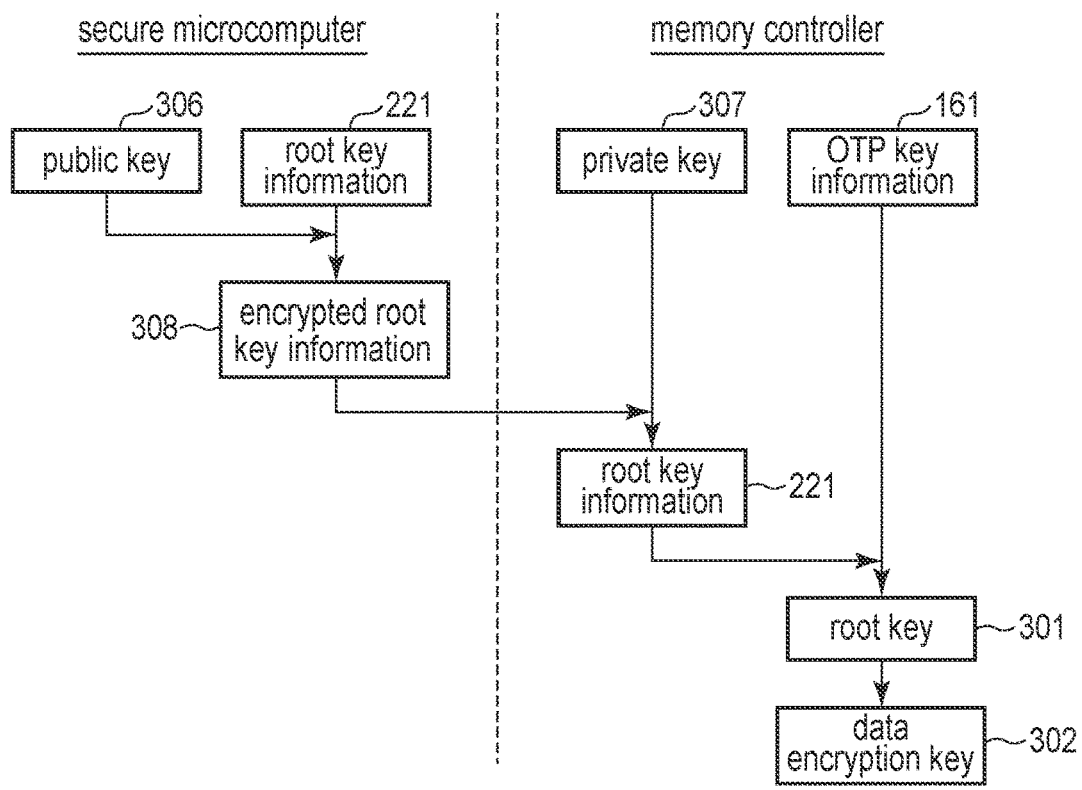
FIG. 8 is a diagram illustrating a third example in which the data encryption key is generated in the information processing system of the first embodiment.

FIG. 8 illustrates a third example in which the memory controller 4 generates the data encryption key 302. In this third example, the case where the root key information 221 is transmitted from the secure microcomputer 7 to the memory controller 4 by a public key cryptographic method (for example, RSA) to guarantee the confidentiality and integrity of the root key information 221 is exemplified.

The key information transmitting module 212 of the secure microcomputer 7 reads the root key information 221 from the NOR flash memory 22. The key information transmitting module 212 encrypts the root key information 221 with a public key 306 to acquire encrypted root key information 308. The public key 306 is, for example, an RSA public key. The public key 306 may be stored in the secure microcomputer 7 before the shipment of the secure microcomputer 7 or may be received from the memory controller 4. The key information transmitting module 212 transmits the encrypted root key information 308 to the memory controller 4.

The key information receiving module 122 of the memory controller 4 receives the encrypted root key information 308 from the secure microcomputer 7. The key information receiving module 122 decrypts the received encrypted root key information 308 with a private key 307 corresponding to the public key 306 to acquire the root key information 221. The private key 307 is, for example, an RSA private key. The private key 307 may be stored in the SSD 3 before the shipment of the SSD 3 or generated by the memory controller 4.

The encryption key generation module 123 of the memory controller 4 generates a root key 301 using the root key information 221 acquired by the decryption and the OTP key information 161 read from the OTP memory 16. The key derivation method for generating the root key 301 is as described above.

The encryption key generation module 123 generates a data encryption key 302 indirectly or directly derived from the generated root key 301. The encryption key generation module 123 sets the generated data encryption key 302 in the encryption circuit 15.

Figure 9:
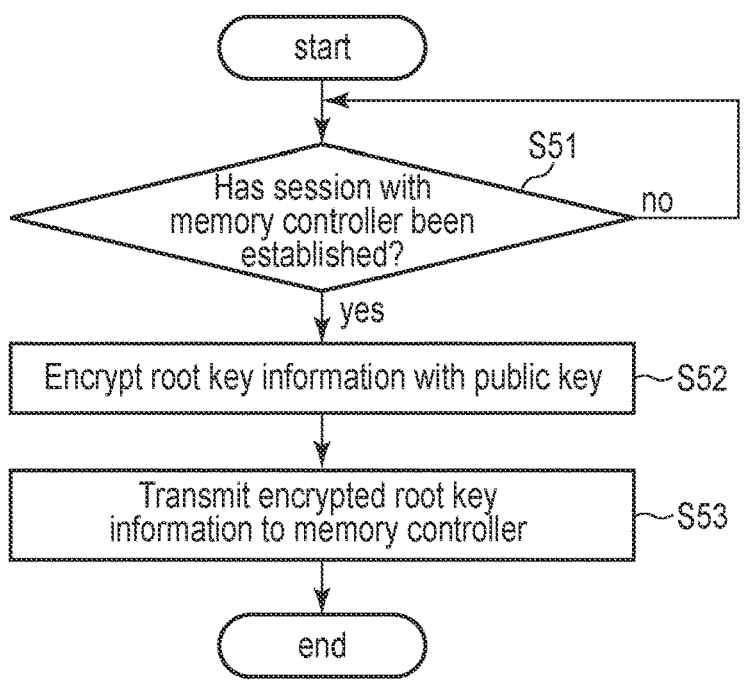
FIG. 9 is a flowchart illustrating a third example of the procedure of the key information transmission process executed in the secure microcomputer of the first embodiment.

FIG. 9 is a flowchart illustrating a third example of the procedure of the key information transmission process executed in the secure microcomputer 7.

First, the secure microcomputer 7 determines whether a session with the memory controller 4 of the SSD 3 has been established (step S51). When a session with the memory controller 4 has not been established (NO in step S51), the process returns to step S51, and it is determined again whether a session with the memory controller 4 has been established.

When a session with the memory controller 4 has been established (YES in step S51), the secure microcomputer 7 encrypts the root key information 221 stored in the NOR flash memory 22 with the public key 306 to obtain the encrypted root key information 308 (step S52). Then, the secure microcomputer 7 transmits the encrypted root key information 308 to the memory controller 4 (step S53), and ends the key information transmission process.

Figure 10:
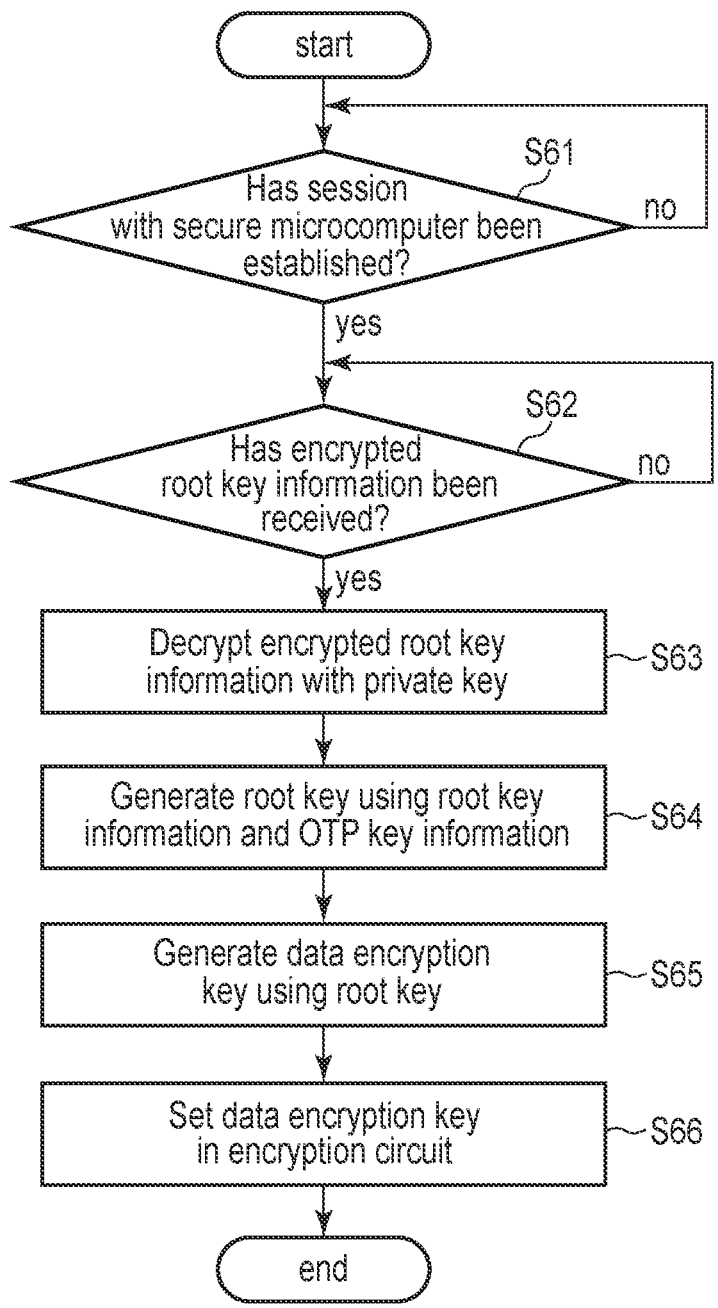
FIG. 10 is a flowchart illustrating a third example of the procedure of the encryption key setting process executed in the memory system of the first embodiment.

FIG. 10 is a flowchart illustrating a third example of the procedure of the encryption key setting process executed in the memory controller 4.

First, the memory controller 4 determines whether a session with the secure microcomputer 7 has been established (step S61). When a session with the secure microcomputer 7 has not been established (NO in step S61), the process returns to step S61, and it is determined again whether a session with the secure microcomputer 7 has been established.

When a session with the secure microcomputer 7 has been established (YES in step S61), the memory controller 4 determines whether the encrypted root key information 308 has been received from the secure microcomputer 7 (step S62). When the encrypted root key information 308 has not been received (NO in step S62), the process returns to step S62, and it is determined again whether the encrypted root key information 308 has been received.

When the encrypted root key information 308 has been received (YES in step S62), the memory controller 4 decrypts the received encrypted root key information 308 with the private key 307 to obtain the root key information 221 (step S63). Note that if the encrypted root key information 308 is not encrypted with the public key 306 corresponding to the private key 307, the root key information 221 cannot be obtained by the decryption using the private key 307, so the encryption key setting process ends. The decryption result of the encrypted root key information 308 using the private key 307 may include, for example, a CRC code. The memory controller 4 may verify by using the CRC code whether the root key information 221 has been obtained correctly as the decryption result of the encrypted root key information 308 using the private key 307.

The memory controller 4 generates a root key 301 using the acquired root key information 221 and the OTP key information 161 stored in the OTP memory 16 (step S64). The procedure of subsequent steps S65 and S66 are similar to the procedure of the steps S24 and S25, respectively, which are described above with reference to the flowchart of FIG. 4.

The data encryption key 302 is set in the encryption circuit 15 of the SSD 3 according to the configuration and procedure described with reference to FIGS. 8 to 10 above. Therefore, by using the data encryption key 302, the encryption circuit 15 can encrypt data to be written into the NAND flash memory 5 and can decrypt data read from the NAND flash memory 5.

Fourth Example of Generation of Data Encryption Key

FIG. 11 illustrates a fourth example in which the memory controller 4 generates the data encryption key 302. In this fourth example, the case where the root key 301 is stored in the NOR flash memory 22 of the secure microcomputer 7 instead of the root key information 221, and the root key 301 is transmitted from the secure microcomputer 7 to the memory controller 4 by the common key cryptographic method is exemplified. The confidentiality and integrity of the root key 301 are guaranteed by transmitting it by the common key cryptographic method conforming to SP800-38F or the like.

The key information transmitting module 212 of the secure microcomputer 7 reads the root key 301 from the NOR flash memory 22. The key information transmitting module 212 encrypts the root key 301 with the common key 303 to acquire an encrypted root key 310. The common keys 303 and 305 shared by the secure microcomputer 7 and the memory controller 4 are as described above in the second example of the generation of the data encryption key. The common keys 303 and 305 are also referred to as a root key encryption key for encryption and decryption of the root key 301. The key information transmitting module 212 transmits the encrypted root key 310 to the memory controller 4.

The key information receiving module 122 of the memory controller 4 receives the encrypted root key 310 from the secure microcomputer 7. The key information receiving module 122 decrypts the received encrypted root key 310 with the common key 305 to acquire the root key 301.

The encryption key generation module 123 generates a data encryption key 302 indirectly or directly derived from the root key 301 obtained by the decryption. The encryption key generation module 123 sets the generated data encryption key 302 in the encryption circuit 15.

By transmitting the root key 301 by the common key cryptographic method, a computation load for generating the root key 301 in the memory controller 4 is reduced and the processing time is shortened as compared with the case of transmitting the root key information 221 or the root key 301 by the public key cryptographic method. This is because the process of encrypting data with the common key and decrypting the encrypted data with the common key generally has less computation load and shorter processing time than the process of encrypting the data with the public key and decrypting the encrypted data with the private key.

FIG. 12 illustrates a fourth example of the procedure of the key information transmission process executed in the secure microcomputer 7. Here, the case where a session key generated and exchanged when establishing a session with the memory controller 4 is used as the common key 303 is exemplified.

The procedure of steps S71 and S72 are similar to the procedure of the steps S31 and S32, respectively, which are described above with reference to the flowchart of FIG. 6. Thereby, the secure microcomputer 7 acquires the session key used as the common key 303.

Next, the secure microcomputer 7 encrypts the root key 301 stored in the NOR flash memory 22 with the common key 303 to obtain the encrypted root key 310 (step S73). Then, the secure microcomputer 7 transmits the encrypted root key 310 to the memory controller 4 (step S74), and ends the key information transmission process.

Figure 13:
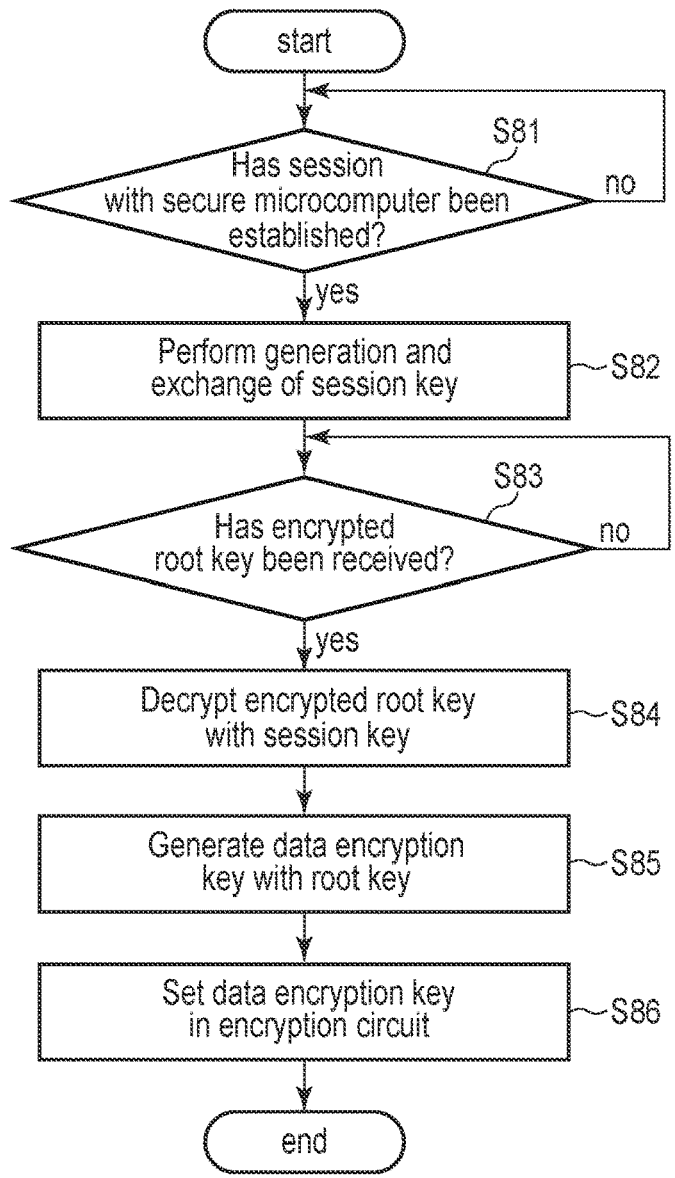
FIG. 13 is a flowchart illustrating a fourth example of the procedure of the encryption key setting process executed in the memory system of the first embodiment.

FIG. 13 is a flowchart illustrating a fourth example of the procedure of the encryption key setting process executed in the memory controller 4. Here, the case where a session key generated and exchanged when establishing a session with the secure microcomputer 7 is used as the common key 305 is exemplified.

The procedure of steps S81 and S82 are similar to the procedure of the steps S41 and S42, respectively, which are described above with reference to the flowchart of FIG. 7. Thereby, the memory controller 4 acquires a session key used as the common key 305.

Next, the memory controller 4 determines whether the encrypted root key 310 has been received from the secure microcomputer 7 (step S83). When the encrypted root key 310 has not been received (NO in step S83), the process returns to step S83, and it is determined again whether the encrypted root key 310 has been received.

When the encrypted root key 310 has been received (YES in step S83), the memory controller 4 decrypts the received encrypted root key 310 with the common key 305 to obtain the root key 301 (step S84). Note that if the encrypted root key 310 is not encrypted with the common key 303, the root key 301 cannot be obtained by the decryption using the common key 305, so the encryption key setting process ends. The decryption result of the encrypted root key 310 using the common key 305 may include, for example, a CRC code. The memory controller 4 can verify by using the CRC code whether the root key 301 has been correctly obtained as the decryption result of the encrypted root key 310 using the common key 305.

Alternatively, when the encrypted root key 310 is encrypted with the common key 303 conforming to NIST SP 800-38F, the secure microcomputer 7 also generates check data during the encryption. The secure microcomputer 7 transmits the generated check data to the memory controller 4 together with the encrypted root key 310. The memory controller 4 can verify by using the check data whether the root key 301 has been obtained correctly as the decryption result of the encrypted root key 310 using the common key 305.

The memory controller 4 generates a data encryption key 302 using the acquired root key 301 (step S85). Then, the memory controller 4 sets the data encryption key 302 in the encryption circuit 15 (step S86), and ends the encryption key setting process.

The data encryption key 302 is set in the encryption circuit 15 of the SSD 3 according to the configuration and procedure described with reference to FIGS. 11 to 13 above. Therefore, by using the data encryption key 302, the encryption circuit 15 can encrypt data to be written into the NAND flash memory 5 and can decrypt data read from the NAND flash memory 5. According to various methods including the first to fourth examples of the generation of the data encryption key described above, the memory controller 4 can generate the data encryption key 302 using the root key information 221 or the root key 301 received from the secure microcomputer 7 and set the generated data encryption key 302 in the encryption circuit 15. In addition, in the second to fourth examples of the generation of the data encryption key described above, the methods for transmitting the root key information 221 or the root key 301 from the secure microcomputer 7 to the memory controller 4 by the common key cryptographic method or the public key cryptographic method is exemplified. In these methods, the confidentiality and integrity of the root key information 221 or the root key 301 is guaranteed. The present embodiment is not limited to the methods shown in the second to fourth examples. Various methods for guaranteeing the confidentiality and integrity of the transmitted root key information 221 or root key 301 can be applied.

(Cryptographic Erase)

Figure 14:
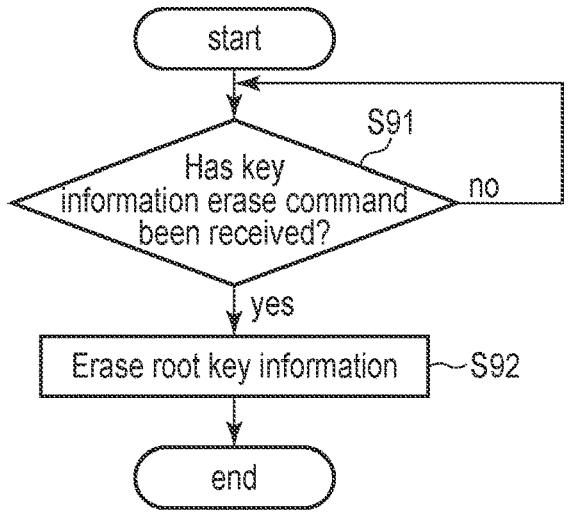
FIG. 14 is a flowchart illustrating an example of the procedure of a cryptographic erase process executed in the secure microcomputer of the first embodiment.

FIG. 14 is a flowchart illustrating an example of the procedure of a cryptographic erase process executed in the secure microcomputer 7 (more specifically, by the key information erasing module 213). Here, the case where the root key information 221 is stored in the secure microcomputer 7 as the key information for the memory controller 4 to generate the data encryption key 302 will be exemplified.

First, the secure microcomputer 7 determines whether a key information erase command has been received from the host 2 (step S91). When a key information erase command has not been received (NO in step S91), the process returns to step S91, and it is determined again whether a key information erase command has been received.

When a key information erase command has been received (YES in step S91), the secure microcomputer 7 erases the root key information 221 stored in the NOR flash memory 22 (step S92). The secure microcomputer 7 may overwrite the root key information 221 stored in the NOR flash memory 22 with, for example, a random number to erase the root key information 221. As a result, the root key information 221 to be used by the memory controller 4 to generate the root key 301 is erased from the NOR flash memory 22 in the secure microcomputer 7.

Since the root key information 221 is erased, the memory controller 4 cannot generate the root key 301 and the data encryption key 302 thereafter. Therefore, the memory controller 4 cannot decrypt encrypted data read from the NAND flash memory 5. Hence, the erasure of the root key information 221 realizes the cryptographic erase of the SSD 3.

Note that the secure microcomputer 7 may update the root key information 221 stored in the NOR flash memory 22 when receiving the key information erase command from the host 2. In this case, the secure microcomputer 7 transmits different items of root key information 221 to the memory controller 4 before and after the cryptographic erase process is performed in accordance with the key information erase command.

Further, when the secure microcomputer 7 receives the key information erase command from the host 2, the root key information 221 stored in the secure microcomputer 7 may not only be erased, but the data encryption key 302 currently used by the memory controller 4 may also be invalidated (for example, erased). Cryptographic erase processes executed in the secure microcomputer 7 and the memory controller 4 will be described with reference to the flowcharts of FIGS. 15 and 16.

Figure 15:
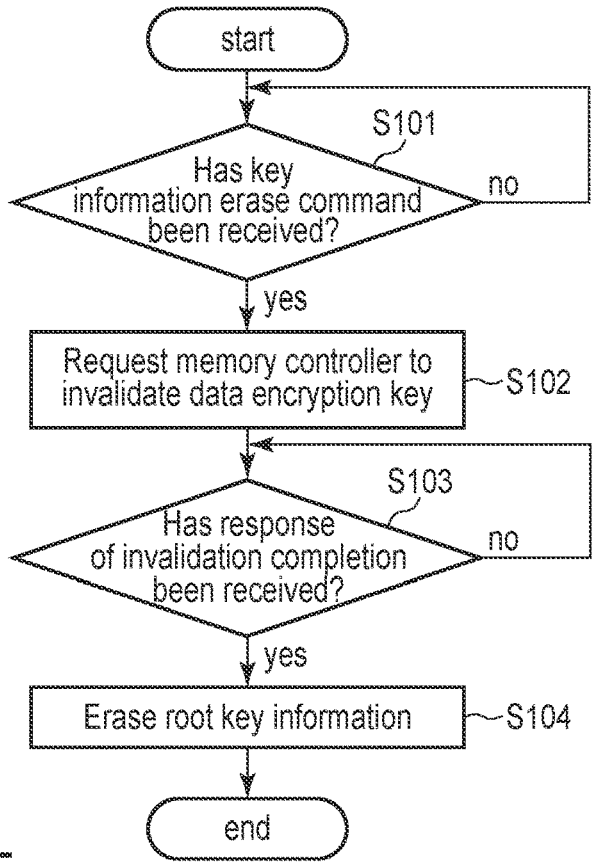
FIG. 15 is a flowchart illustrating another example of the procedure of the cryptographic erase process executed in the secure microcomputer of the first embodiment.

FIG. 15 illustrates another example of the procedure of the cryptographic erase process executed in the secure microcomputer 7.

First, the secure microcomputer 7 determines whether a key information erase command has been received from the host 2 (step S101). When a key information erase command has not been received (NO in step S101), the process returns to step S101, and it is determined again whether a key information erase command has been received.

When a key information erase command has been received (YES in step S101), the secure microcomputer 7 requests the memory controller 4 to invalidate the data encryption key 302 (step S102). In accordance with this request, the memory controller 4 invalidates the data encryption key 302 that is set in the encryption circuit 15.

The secure microcomputer 7 determines whether a response indicative of completion of the invalidation of the data encryption key 302 has been received from the memory controller 4 (step S103). When the response has not been received from the memory controller 4 (NO in step S103), the process returns to step S103, and it is determined again whether the response has been received.

When the response has been received from the memory controller 4 (YES in step S103), the secure microcomputer 7 erases the root key information 221 stored in the NOR flash memory 22 (step S104).

Figure 16:
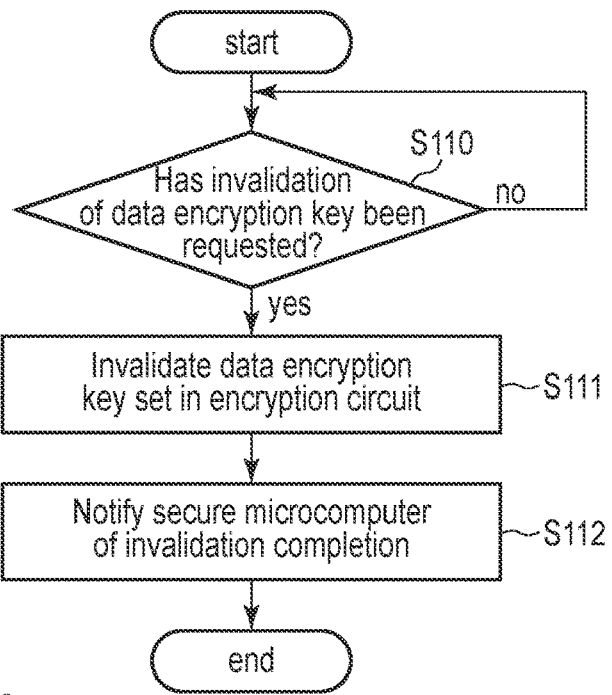
FIG. 16 is a flowchart illustrating an example of the procedure of an invalidation process executed in the memory system of the first embodiment.

FIG. 16 illustrates an example of the procedure of the cryptographic erase process executed in the memory controller 4.

First, the memory controller 4 determines whether the invalidation of the data encryption key 302 has been requested by the secure microcomputer 7 (step S110). When the invalidation of the data encryption key 302 has not been requested (NO in step S110), the process returns to step S110, and it is determined again whether the invalidation of the data encryption key 302 has been requested.

When the invalidation of the data encryption key 302 has been requested (YES in step S110), the memory controller 4 invalidates the data encryption key 302 that is set in the encryption circuit 15 (step S111). The memory controller 4 invalidates the data encryption key 302 stored in, for example, the register in the encryption circuit 15. Then, the memory controller 4 notifies the secure microcomputer 7 that the invalidation of the data encryption key 302 has been completed (step S112).

With the cryptographic erase processes illustrated in FIGS. 15 and 16, the root key information 221, which is to be used by the memory controller 4 to generate the root key 301, is erased from the NOR flash memory 22 in the secure microcomputer 7, and the data encryption key 302 that is generated using the root key information 221 (more specifically, the root key 301 generated using the root key information 221) and set in the encryption circuit 15 is invalidated.

Since the root key information 221 is erased, the memory controller 4 cannot generate the root key 301 and the data encryption key 302 thereafter. Therefore, the memory controller 4 cannot decrypt encrypted data read from the NAND flash memory 5. Therefore, erasure of the root key information 221 realizes the cryptographic erase of the SSD 3.

Furthermore, since the data encryption key 302 that is set in the encryption circuit 15 is invalidated, thereafter, it is possible to prevent the memory controller 4 from encrypting data with the data encryption key 302 derived from the already erased root key information 221, and writing the encrypted data into the NAND flash memory 5. After the root key information 221 is erased, if data is encrypted with the data encryption key 302 remaining in the encryption circuit 15 and the data is written into the NAND flash memory 5, and the data encryption key 302 that is set in the encryption circuit 15 is lost by, for example, restarting the SSD 3, the memory controller 4 cannot decrypt the written encrypted data. Thus, to prevent the encrypted data that cannot be decrypted from being further written into the NAND flash memory 5, the data encryption key 302 that is set in the encryption circuit 15 is invalidated possible.

(When Root Key Information 221 is Used by Multiple SSDs 3)

When the secure microcomputer 7 manages one piece of key information used by multiple SSDs 3, it is preferable that the secure microcomputer 7 does not manage the root key 301, but manages the root key information 221 as in the first to third examples of the generation of the data encryption key described above. In the first to third examples of the generation of the data encryption key 302, the root keys 301, which are used in the SSDs 3 respectively, are generated using a combination of the root key information 221 provided from the secure microcomputer 7 and the OTP key information 161 stored in each of the SSDs 3. Therefore, even if the root key 301 is leaked due to the vulnerability of a certain SSD 3, the leaked root key 301 is different from the root keys 301 used in each of the other SSDs 3. Therefore, it is possible to prevent encrypted data stored in each of the other SSDs 3 from being decrypted with the data encryption key 302 that is generated using the root key 301 leaked from the certain SSD 3.

In addition, when the root key information 221 is leaked, the host 2 or the like may request each SSD 3 to erase the OTP key information 161. In the erase operation for erasing the OTP key information 161, each of memory elements in the OTP memory 16 that are used at least for storing the OTP key information 161 is forced to be a written state (for example, set to zero). This makes it possible to prevent encrypted data stored in each SSD 3 from being decrypted using the leaked root key information 221.

Further, each of the SSDs 3 stores data encrypted with the data encryption key 302 derived from the leaked root key information 221 (or a root key 301 generated from the leaked root key information 221). In a case where the data stored in all the SSDs 3 is not erased but data stored in a specific SSD 3 of the SSDs 3 is discarded, the OTP key information 161 stored in the OTP memory 16 in the specific SSD 3 may be erased. As a result, since the specific SSD 3 cannot generate the data encryption key 302, it is possible to realize the cryptographic erase in which encrypted data, which is encrypted with the data encryption key 302 and stored in the NAND flash memory 5, is prevented from being decrypted.

(When Rewritable FW is Used)

Each function of the session key generation module 121, the key information receiving module 122, and the encryption key generation module 123 by the CPU 12 may be realized by executing a rewritable FW (hereinafter, referred to as a second FW) instead of the non-rewritable FW 61 stored in a ROM or the like. When the SSD 3 is started, the second FW is loaded from the NAND flash memory 5 into the DRAM 6, or received from the secure microcomputer 7 and loaded into the DRAM 6.

The CPU 12 that executes the second FW changes the process for generating the data encryption key 302 depending on whether the SSD 3 conforms to the data protection method for realizing a TCG storage subclass (SSC). As the data protection method used to conform to the SSC, for example, a first data protection method for encrypting data with a data encryption key 302 derived from the OTP key information 161 in the memory controller 4 may be used. Also a second data protection method for encrypting data with a data encryption key 302 derived from the OTP key information 161 and the key information external to the memory controller 4 may be used.

When the memory controller 4 conforms to the first data protection method, the CPU 12 executing the second FW generates a data encryption key 302 derived from the OTP key information 161, and sets the generated data encryption key 302 in the encryption circuit 15. When the memory controller 4 conforms to the second data protection method, the CPU 12 generates a data encryption key 302 derived from the OTP key information 161 and the key information external to the memory controller 4 (for example, the root key information 221 in the secure microcomputer 7) and sets the generated data encryption key 302 in the encryption circuit 15.

More specifically, the CPU 12 may control whether the root key information 221 stored in the secure microcomputer 7 is used to generate a data encryption key 302 depending on whether the secure microcomputer 7 is connected to the SSD 3. When the secure microcomputer 7 is not connected to the SSD 3, the CPU 12 generates a data encryption key 302 using, for example, the OTP key information 161.

On the other hand, when the secure microcomputer 7 is connected to the SSD 3, the CPU 12 generated a data encryption key 302 using the OTP key information 161 and the root key information 221 stored in the secure microcomputer 7. That is, the CPU 12 functions as the session key generation module 121, the key information receiving module 122, and the encryption key generation module 123 when the secure microcomputer 7 is connected to the SSD 3.

In this way, the CPU 12 that executes the second FW can change the operation in accordance with the TCG SSC standard to which the memory controller 4 conforms. Therefore, the CPU 12 that executes the second FW does not affect the operation of the memory controller 4 that conforms only to the first data protection method. Then, in the memory controller 4 that conforms to the second data protection method, the CPU 12 that executes the second FW can generate the data encryption key 302 derived from the OTP key information 161 and the root key information 221 stored in the secure microcomputer 7 according to the functions of the session key generation module 121, the key information receiving module 122, and the encryption key generation module 123.

When the second FW is stored in the secure microcomputer 7 (for example, in the NOR flash memory 22), the key information erasing module 213 of the secure microcomputer 7 may erase not only the key information 221, but also the second FW in response to receiving a key information erase command from the host 2. As a result, the control program for generating the root key 301 using the OTP key information 161 and the root key information 221, and for generating the data encryption key 302 is lost, so the memory controller 4 cannot generate the root key 301 and the data encryption key 302. Therefore, it is possible to realize the cryptographic erase in which encrypted data stored in the SSD 3 is prevented from being decrypted.

(Erasure Certification)

For discard or reuse of a storage such as an SSD 3, an electronic certificate, which certificates that the data stored in the storage has been erased and the data erase operation has been reliably done, may be used.

The memory controller 4, for example by using a secure boot, in a case where it prevents a tampered program (for example, malware) from being executed, may assign a digital signature to an execution log of an erase command and a dump command and issue the electronic certificate certificating the data erasure. The secure boot is a booting method of verifying each of programs such as a boot loader and FW at the time of starting the SSD 3 before executing the programs and executing the programs determined to have validity by the verification.

When verifying whether the data in the SSD 3 has been securely erased, the host 2 acquires the electronic certificate including the identification information of the SSD 3 and uses the digital signature assigned to the electronic certificate to verify the validity of the electronic certificate. That is, if the electronic certificate is valid, the host 2 determines that it is certificated that the data in the SSD 3 has been erased and the data erase operation has been reliably done. On the other hand, if the electronic certificate is invalid, the host 2 determines that the data in the SSD 3 has not been erased or that it is not certificated that the data erase operation has been reliably done.

In the present embodiment, the secure microcomputer 7 may issue the electronic certificate that certificates that the data stored in the SSD 3 has been erased and the data erase operation has been reliably done in the cryptographic erase process in accordance with a key information erase command. More specifically, the secure microcomputer 7 assigns a digital signature to log data (erase log), which is generated when executing the cryptographic erase process in accordance with the key information erase command, using a private key, and issues the electronic certificate.

Figure 17:
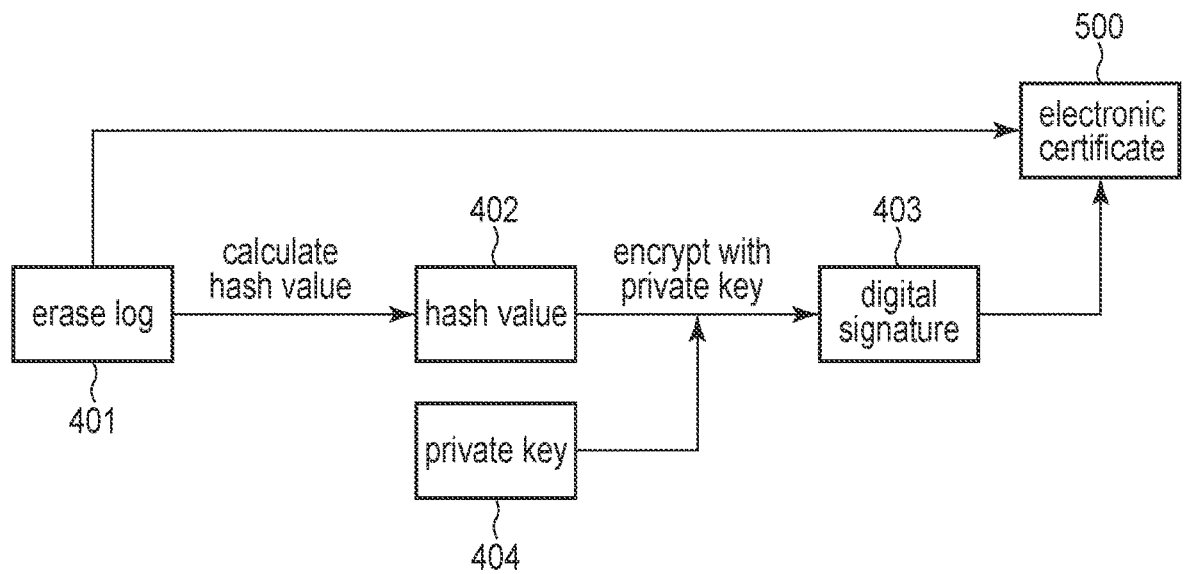
FIG. 17 is a diagram illustrating an example in which a digital signature is generated by the secure microcomputer of the first embodiment.

FIG. 17 illustrates an example in which the secure microcomputer 7 generates a digital signature 403. The key information erasing module 213 of the secure microcomputer 7 executes the cryptographic erase process for erasing the root key information 221 in response to receiving a key information erase command from the host 2. At that time, the key information erasing module 213 generates an erase log 401 that includes information on the execution process and the execution result of the cryptographic erase process.

The certificate issuing module 214 calculates a hash value 402 of the erase log 401. The certificate issuing module 214 encrypts the calculated hash value 402 with a private key 404 to acquire the digital signature 403. The private key 404 is, for example, an RSA private key. The private key 404 may be stored in the secure microcomputer 7 before the shipment of the secure microcomputer 7 or may be generated by the secure microcomputer 7.

Next, the certificate issuing module 214 issues an electronic certificate 500 to which the digital signature 403 is assigned. The electronic certificate 500 includes, for example, the erase log 401, identification information (ID) of the secure microcomputer 7, identification information of the SSD 3, and a time stamp indicative of the date and time when the erasure was performed.

Figure 18:
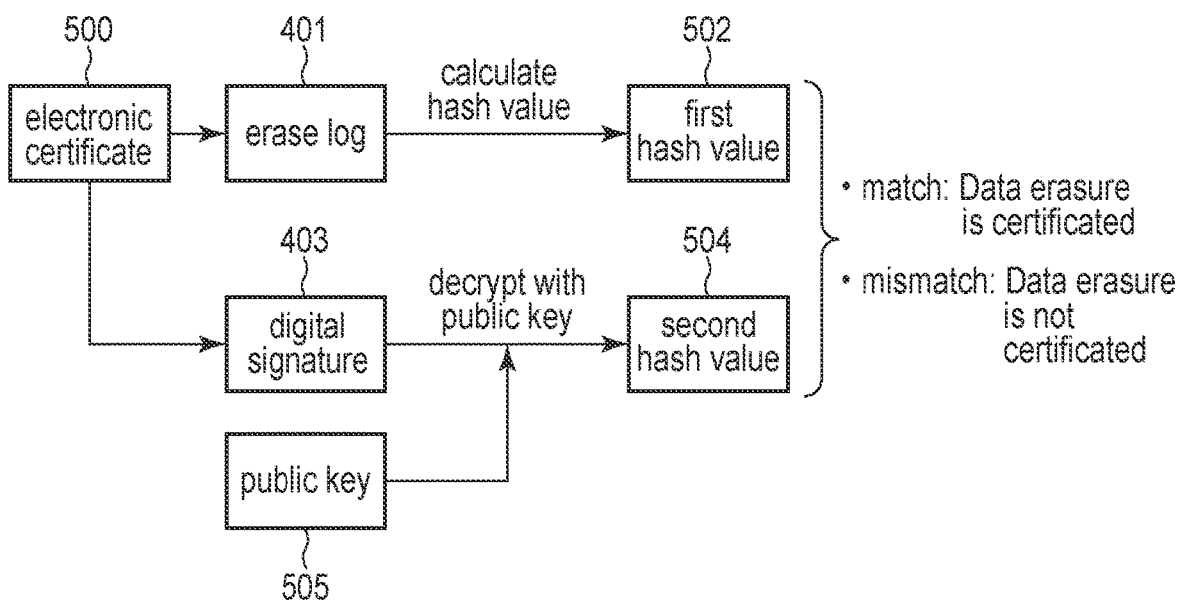
FIG. 18 is a diagram illustrating an example of determining whether data erasure has been certificated using an electronic certificate to which the digital signature is added.

FIG. 18 illustrates an example of determining whether the data erasure of the SSD 3 has been certificated using the electronic certificate 500 to which the digital signature 403 is assigned. Here, the case where the host 2 determines whether the data erasure of the SSD 3 has been certificated using the electronic certificate 500 including the identification information of the SSD 3 is exemplified.

The host 2 acquires the erase log 401 included in the electronic certificate 500 and calculates a hash value 502 of the erase log 401 (hereinafter, referred to as a first hash value 502). In addition, the host 2 decrypts the digital signature 403 assigned to the electronic certificate 500 with a public key 505 of the secure microcomputer 7 to calculate a hash value 504 (hereinafter, referred to as a second hash value 504). The public key 505 is, for example, an RSA public key. The host 2 may receive the public key 505 from the secure microcomputer 7 in advance.

The host 2 compares the first hash value 502 and the second hash value 504 to determine whether the first hash value 502 matches the second hash value 504. If the first hash value 502 matches the second hash value 504, the host 2 determines that the data erasure of the SSD 3 is certificated with the electronic certificate 500 to which the digital signature 403 is assigned. On the other hand, if the first hash value 502 is different from the second hash value 504, the host 2 determines that the data erasure of the SSD 3 is not certificated with the electronic certificate 500 to which the digital signature 403 is assigned.

With such a configuration for the erasure certification, the user can confirm that the data stored in the SSD 3 is securely erased on the basis of the fact that the electronic certificate 500 to which the digital signature 403 is assigned is valid. The secure microcomputer 7 issues the electronic certificate 500 to which the digital signature 403 is assigned when executing the cryptographic erase process that erases the root key information 221, so the erasure of the data encrypted with the data encryption key 302 derived from the root key information 221 can be guaranteed.

FIG. 19 is a flowchart illustrating an example of the procedure of the cryptographic erase process including issuance of an electronic certificate executed in the secure microcomputer 7.

The procedure of steps S121 and S122 are similar to the procedure of the steps S91 and S92, respectively, which are described above with reference to the flowchart of FIG. 14.

Note that the procedure of the steps S121 and S122 may be replaced with the procedure of the steps S101 to S104 described above with reference to the flowchart of FIG. 15. In this case, the secure microcomputer 7 can erase the root key information 221 after confirming that the data encryption key 302 which is set in the encryption circuit 15 in the memory controller 4 has been invalidated.

After erasing the root key information 221, the secure microcomputer 7 calculates the hash value 402 of the execution log 401 of the key information erase command (that is, the erase log) (step S123). The secure microcomputer 7 encrypts the hash value 402 with the private key 404 to generate the digital signature 403 (step S124). Then, the secure microcomputer 7 issues the electronic certificate 500 to which the digital signature 403 is assigned (step S125). The secure microcomputer 7 may transmit the electronic certificate 500 to which the digital signature 403 is assigned to, for example, the host 2.

By the above cryptographic erase process, the secure microcomputer 7 can perform the data erasure of the SSD 3 by erasing the root key information 221, and can issue the electronic certificate 500 that guarantees the data erasure.

Note that the electronic certificate 500 may be issued by the memory controller 4 of the SSD 3. For example, when the SSD 3 is discarded, the memory controller 4 may erase the OTP key information 161 in response to receiving a key information erase command from the host 2. At that time, the memory controller 4 generates a digital signature 403 by using a private key for log data of the process in which the OTP key information 161 is erased. Then, the memory controller 4 issues an electronic certificate 500 to which the digital signature 403 is assigned. Thereby, it is possible to certificate the data is erased from the SSD 3. The electronic certificate 500 includes, for example, the log data, the identification information of the SSD 3, and the date and time when the OTP key information 161 is erased. The electronic certificate 500 may further include the identification information of the secure microcomputer 7.

In this case, the CPU 12 of the SSD 3, which has the same functions as the key information erasing module 213 and the certificate issuing module 214 of the secure microcomputer 7 described above, erases the OTP key information 161 and issues the electronic certificate 500 to which the digital signature 403 is assigned.

The host 2 uses the electronic certificate 500 issued by the memory controller 4 of an SSD 3 (referred to as a first SSD 3) to verify whether the data erasure from the first SSD 3 is certified. The verification method is similar to the method described above with reference to FIG. 18.

When the data erasure from the first SSD 3 is certificated, the host 2 may prohibit establishment of a session with an SSD 3 having the identification information of the first SSD 3. This can prevent access to the first SSD 3 that is already discarded.

Second Embodiment

In the first embodiment, the memory controller 4 of the SSD 3 acquires the root encryption key information 221 or the root key 301 for generating the data encryption key 302 from the external secure microcomputer 7. In the second embodiment, the SSD 3 includes the secure microcomputer V.

The second embodiment and the first embodiment differ only in the configuration in which the SSD 3 includes the secure microcomputer 7, and an interface for communicating with the secure microcomputer 7 is further provided in the memory controller 4. Hereinafter, the differences from the first embodiment will be mainly described.

FIG. 20 illustrates a configuration of an information processing system 1 according to the second embodiment. As illustrated in FIG. 20, the secure microcomputer 7 is provided inside the SSD 3. More specifically, the secure microcomputer 7 is provided on, for example, a substrate built in the SSD 3. The configuration of the secure microcomputer 7 is the same as that of the first embodiment.

Further, the memory controller 4 includes, in addition to the configuration described above in the first embodiment, a microcomputer interface (I/F) 17 that communicates with the secure microcomputer 7. The memory controller 4 communicates with the secure microcomputer 7 via the microcomputer I/F 17, not via the host I/F 11. The microcomputer I/F 17 conforms to an interface standard such as inter-integrated circuit (I2C) or serial peripheral interface (SPI).

The microcomputer I/F 17 is a hardware interface that communicates with the secure microcomputer 7. The microcomputer I/F 17 functions as a transmission/reception circuit that transmits/receives various commands and information to/from the secure microcomputer 7.

More specifically, the memory controller 4 receives the root key information 221, the encrypted root key information 304 and 308, or the encrypted root key 310 from the secure microcomputer 7 via the microcomputer I/F 17.

Further, when the memory controller 4 receives from the host 2 a command to be processed by the secure microcomputer 7, the memory controller 4 transmits the command to the secure microcomputer 7 via the microcomputer I/F 17. The memory controller 4 transmits, for example, a key information erase command, which is received from the host 2 via the host I/F 11, to the secure microcomputer 7 via the microcomputer I/F 17.

Since the SSD 3 includes the secure microcomputer 7, a session can be established between the memory controller 4 and the secure microcomputer 7 and the session key (that is, the common keys 303 and 305) can be shared before the host I/F 11 becomes operable when the SSD 3 starts.

As described above, according to the first and second embodiments, security against data leakage can be enhanced.

In the SSD 3, the NAND flash memory 5 includes memory elements in each of which data is able to be written multiple times. The OTP memory 16 includes memory elements in each of which data is able to be written once, and stores the OTP key information 161. The memory controller 4 receives root key information 221 stored in the secure microcomputer 7, generates a root key 301 using the OTP key information 161 and the root key information 221, and generates a data encryption key 302 using the root key 301. The memory controller 4 encrypts data to be written into the NAND flash memory 5 with the data encryption key 302, and decrypts data read from the NAND flash memory 5 with the data encryption key 302.

Further, in the secure microcomputer 7, the NOR flash memory 22 includes memory elements in each of which data is able to be written multiple times, and stores the root key information 221 for generating the data encryption key 302 used in the SSD 3. The CPU 21 transmits the root key information 221 to the SSD 3. When the host 2 requests the root key information 221 to be erased, the CPU 21 erases the root key information 221 stored in the NOR flash memory 22.

In this way, the SSD 3 generates, for example, the root key 301 using the root key information 221 received from the secure microcomputer 7 and the OTP key information 161 stored in the OTP memory 16, and generates the data encryption key 302 using the root key 301. In this case, by erasing the root key information 221 stored in the secure microcomputer 7, the SSD 3 cannot generate the data encryption key 302 again. Then, data that is encrypted with the data encryption key 302 and stored in the NAND flash memory 5 cannot be decrypted, so the data leakage can be prevented.

Further, in a case where the root key information 221 stored in the secure microcomputer 7 is erased but the OTP key information 161 stored in the OTP memory 16 is not erased, it is not necessary to provide the SSD 3 with a large amount of OTP memory 16 (for example, a large number of e-Fuse elements) to store new OTP key information 161 in accordance with the erasure of the OTP key information 161.

Furthermore, when the root key information 221 stored in the secure microcomputer 7 is erased, it is not necessary to perform an erase operation on the OTP memory 16 having low reliability for erasing the OTP key information 161. Therefore, the reliability of data erasure of the SSD 3 in which the key information is erased (i.e., cryptographic erase) can be enhanced, and the security against data leakage can be strengthened.

Each of various functions described in the first and second embodiments may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
a memory system including a first nonvolatile memory, a second nonvolatile memory, and a controller,
the first nonvolatile memory including a first memory element,
the second nonvolatile memory including a second memory element in which data is able to be written only once, the second memory element storing first key information; and
an information processing apparatus communicable with a host and the memory system, the information processing apparatus including a third nonvolatile memory and a processor,
the third nonvolatile memory including a memory element in which data is able to be written multiple times and storing second key information for generating a first key to be used in the memory system;
wherein
the processor of the information processing apparatus is configured to:
read the second key information stored in the third nonvolatile memory; and
transmit the second key information to the memory system, and
the controller of the memory system is configured to:
receive the second key information from the information processing apparatus;
read the first key information stored in the second nonvolatile memory;
derive the first key from the first key information and the second key information;
generate a second key using at least the first key; and
encrypt data, which is to be written into the first nonvolatile memory, with the second key, and decrypt data, which is read from the first nonvolatile memory, with the second key;
wherein
the second key information stored in the third nonvolatile memory is erased when a second key information erase command is received from the host and new key information is generated in accordance with receiving the second key information erase command.

2. The information processing system of claim 1, wherein
the information processing system is communicable with the host, and
the processor of the information processing apparatus is further configured to erase the second key information stored in the nonvolatile memory when erasure of the second key information is requested by the host.

3. The information processing system of claim 2, wherein
the processor of the information processing apparatus is further configured to:
generate a digital signature for log data of processing of erasing the second key information, by using a private key; and
transmit an electronic certificate and the digital signature to the host, the electronic certificate including the log data, identification information of the information processing apparatus, identification information of the memory system, and information about a date and time when the second key information is erased.

4. The information processing system of claim 1, wherein the first key information stored in the second nonvolatile memory is erased when the second key information is leaked or when the memory system of the first key information is designated.

5. The information processing system of claim 1, wherein the information processing apparatus includes a key information erasing module.

6. The information processing system of claim 5, wherein the second key information is erased by the key information erasing module.

7. The information processing system of claim 1, wherein the controller includes an encryption key generation module which derives the first key from the received second key information and the first key information read from the second nonvolatile memory.

\* \* \* \* \*